[12] United States Patent
Damnjanovic et al.

(10) Patent No.: US 12,177,863 B2
(45) Date of Patent: Dec. 24, 2024

(54) TECHNIQUES FOR JOINT UE RELAY SELECTION AND ACTIVATION

(71) Applicant: QUALCOMM Incorporated, San Diego, CA (US)

(72) Inventors: Jelena Damnjanovic, Del Mar, CA (US); Junyi Li, Fairless Hills, PA (US); Hua Wang, Basking Ridge, NJ (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 17/585,158

(22) Filed: Jan. 26, 2022

(65) Prior Publication Data
US 2023/0239882 A1 Jul. 27, 2023

(51) Int. Cl.
*H04W 72/23* (2023.01)
*H04W 40/22* (2009.01)
(Continued)

(52) U.S. Cl.
CPC ........... *H04W 72/23* (2023.01); *H04W 40/22* (2013.01); *H04W 88/04* (2013.01); *H04W 92/18* (2013.01)

(58) Field of Classification Search
CPC ..... H04W 72/23; H04W 40/22; H04W 88/04; H04W 92/18
(Continued)

(56) References Cited

U.S. PATENT DOCUMENTS

2003/0220075 A1* 11/2003 Baker ................ H04B 7/15528
455/17
2005/0048914 A1* 3/2005 Sartori ................ H04B 7/2606
455/67.11
(Continued)

OTHER PUBLICATIONS

3GPP TS 24.554, "3rd Generation Partnership Project; Technical Specification Group Core Network and Terminals; Proximity-services (ProSe) in 5G System (5GS) protocol Aspects; Stage 3 (Release 17)", CP-213065, 3GPP TS 24.554, V1.0.0, 3rd Generation Partnership Project, Mobile Competence Centre, 650, Route Des Lucioles, F-06921 Sophia-Antipolis Cedex, France, Nov. 30, 2021, 248 Pages, XP052096589, Section 8.2.2 (p. 149).
(Continued)

*Primary Examiner* — Mark G. Pannell
(74) *Attorney, Agent, or Firm* — Dalei Dong; Holland & Hart LLP

(57) ABSTRACT

Methods, systems, and devices for wireless communications are described. A target user equipment (UE) may communicate (e.g., transmit, receive) a message indicating a relay UE for relaying wireless communications between the target UE and a base station. The relay UE is selected from a set of candidate relay UEs based on existing sidelink relay communication links at the relay UE, candidate target UEs associated with the relay UE, existing communication sidelinks between the target UE and the candidate relay UEs, or any combination thereof. The target UE may receive a first control signal indicating a sidelink relay communication link for communicating messages between the first UE and the base station via the relay UE, and receive a second control signal activating the sidelink relay communication link. The target UE may then communicate a message to or from the base station via the relay UE and the sidelink relay communication link.

29 Claims, 14 Drawing Sheets

(51) Int. Cl.
*H04W 88/04* (2009.01)
*H04W 92/18* (2009.01)

(58) Field of Classification Search
USPC .......................................................... 370/315
See application file for complete search history.

(56) References Cited

U.S. PATENT DOCUMENTS

| | | | | |
|---|---|---|---|---|
| 2009/0296626 A1* | 12/2009 | Hottinen | ................ | H04B 7/155 |
| | | | | 370/315 |
| 2012/0252355 A1* | 10/2012 | Huang | .............. | H04W 36/0033 |
| | | | | 455/7 |
| 2013/0039262 A1* | 2/2013 | Lim | ....................... | H04B 7/155 |
| | | | | 370/315 |
| 2013/0188552 A1* | 7/2013 | Kazmi | .................... | H04L 5/001 |
| | | | | 370/315 |
| 2014/0349663 A1* | 11/2014 | Shu | ..................... | H04W 74/006 |
| | | | | 455/450 |
| 2015/0350859 A1* | 12/2015 | Hiben | ................... | H04W 40/22 |
| | | | | 455/404.1 |
| 2018/0123683 A1* | 5/2018 | Wakabayashi | ........ | H04W 40/04 |
| 2018/0159616 A1* | 6/2018 | Aminaka | .............. | H04W 92/18 |
| 2018/0234919 A1* | 8/2018 | Tsuda | .................... | H04W 88/04 |
| 2020/0106539 A1* | 4/2020 | Yu | ......................... | H04W 76/00 |
| 2020/0252909 A1* | 8/2020 | Yu | ......................... | H04W 80/08 |
| 2021/0144781 A1* | 5/2021 | Xu | ......................... | H04W 24/02 |
| 2021/0160956 A1 | 5/2021 | Wang et al. | | |
| 2021/0168682 A1* | 6/2021 | Xu | ......................... | H04W 76/23 |
| 2021/0289580 A1 | 9/2021 | Damnjanovic et al. | | |
| 2023/0023639 A1* | 1/2023 | Shi | ........................ | H04W 88/04 |

OTHER PUBLICATIONS

International Search Report and Written Opinion—PCT/US2022/082228—ISA/EPO—Apr. 20, 2023.

* cited by examiner

TECHNIQUES FOR JOINT UE RELAY SELECTION AND ACTIVATION

FIELD OF DISCLOSURE

The following relates to wireless communications, including techniques for joint user equipment (UE) relay selection and activation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support communications between the network (e.g., base stations) and UEs (e.g., uplink and downlink communications), as well as communications between multiple UEs (e.g., sidelink communications). In some cases, a communications link between a base station and a UE may become impaired and/or blocked. Link diversity may be improved through the use of sidelink relay communication link sidelink relay communication links, in which a relay UE relays communications between a target UE and the base station. However, conventional techniques for selecting, activating, and deactivating sidelink relay communication link sidelink relay communication links may be improved.

SUMMARY

The described techniques relate to improved methods, systems, devices, and apparatuses that support techniques for joint user equipment (UE) relay selection and activation. Generally, the described techniques support new parameters and signaling which are used to select relay UEs for establishment of relay communication links. In particular, aspects of the present disclosure are directed toward signaling and other configurations which enable wireless devices (e.g., base station, target UE, relay UE) to select a relay UE from a set of candidate relay UEs based on (1) presence of existing and/or potential sidelink relay communication links at the candidate relay UEs, (2) candidate/potential target UEs servable by the respective candidate relay UEs, (3) existing sidelink connections between the target UE and the candidate relay UEs, or any combination thereof. By taking into account existing sidelink relay communication links at the candidate relay UEs and existing sidelink connections at the target UE, techniques described herein may prevent unduly increasing power consumption at selected relay UEs, and improve the efficiency of selected sidelink relay communication links. Upon selecting a relay UE from the set of candidate relay UEs, a sidelink relay communication link with the selected relay UE may be configured via Layer 3 (L3) signaling (e.g., radio resource control (RRC) signaling), and may be activated via Layer 1 (L1) and/or Layer 2 (L2) signaling (e.g., downlink control information (DCI) signaling, medium access control-control element (MAC-CE) messaging).

A method is described. The method may include communicating a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, receiving, from the base station based on the identification of the relay UE, a first control signal indicating a sidelink relay communication link for communicating messages between the first UE and the base station via the relay UE, receiving, from the base station, a second control signal that activates the sidelink relay communication link indicated via the first control signal, and communicating, via the sidelink relay communication link, a message to or from the base station via the relay UE.

An apparatus is described. The apparatus may include a processor, memory coupled with the processor, and instructions stored in the memory. The instructions may be executable by the processor to cause the apparatus to communicate a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, receive, from the base station based on the identification of the relay UE, a first control signal indicating a sidelink relay communication link for communicating messages between the first UE and the base station via the relay UE, receive, from the base station, a second control signal that activates the sidelink relay communication link indicated via the first control signal, and communicate, via the sidelink relay communication link, a message to or from the base station via the relay UE.

Another apparatus is described. The apparatus may include means for communicating a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, means for receiving, from the base station based on the identification of the relay UE, a first control signal indicating a sidelink relay communication link for communicating messages between the first UE and the base station via the relay UE, means for receiving, from the base station, a second control signal that activates the sidelink relay communication link indicated via the first control signal, and means for communicating, via the sidelink relay communication link, a message to or from the base station via the relay UE.

A non-transitory computer-readable medium storing code is described. The code may include instructions executable by a processor to communicate a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, receive, from the base station based on the identification of the relay UE, a first control signal indicating a sidelink relay communication link for communicating messages between the first UE and the base station via the relay UE, receive, from the base station, a second control signal that activates the sidelink relay communication link indicated via the first control signal, and communicate, via the sidelink relay communication link, a message to or from the base station via the relay UE.

Some examples of the method, apparatuses, and non-transitory computer-readable medium described herein may further include operations, features, means, or instructions for selecting the relay UE from the set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, where communicating the message including the identification of the relay UE includes transmitting the message to the base station.

Some examples of the method, apparatuses, and non-transitory computer-readable medium described herein may further include operations, features, means, or instructions for receiving, from the relay UE, a sidelink message including an indication of the one or more existing sidelink relay communication links at the relay UE, the one or more candidate target UEs associated with the relay UE, or both, where selecting the relay UE may be based on receiving the sidelink message.

In some examples of the method, apparatuses, and non-transitory computer-readable medium described herein, communicating the message may include operations, features, means, or instructions for receiving, from the base station, the relay UE, or both, the message including the identification of the relay UE.

Some examples of the method, apparatuses, and non-transitory computer-readable medium described herein may further include operations, features, means, or instructions for transmitting, to the base station, the relay UE, or both, a UE assistance information message including an indication of the one or more existing communication sidelinks between the first UE and the set of multiple candidate relay UEs, where receiving the message including the identification of the relay UE may be based on transmitting the UE assistance information message.

Some examples of the method, apparatuses, and non-transitory computer-readable medium described herein may further include operations, features, means, or instructions for transmitting, to the base station, a request to establish the sidelink relay communication link with relay UE based on establishing a wireless connection with the relay UE and receiving the message including the identification of the relay UE from the base station in response to the request.

In some examples of the method, apparatuses, and non-transitory computer-readable medium described herein, the relay UE may be selected from the set of multiple candidate relay UEs based on a first set of beams used for wireless communications via the one or more existing sidelink relay communication links at the relay UE.

In some examples of the method, apparatuses, and non-transitory computer-readable medium described herein, communicating the message to or from the base station via the sidelink relay communication link may include operations, features, means, or instructions for communicating the message via a second set of beams, where the second set of beams may be determined based on the first set of beams.

In some examples of the method, apparatuses, and non-transitory computer-readable medium described herein, the relay UE may be selected from the set of multiple candidate relay UEs based on a first channel quality associated with a sidelink channel between the first UE and the relay UE, a second channel quality associated with a wireless channel between the relay UE and the base station, or both.

In some examples of the method, apparatuses, and non-transitory computer-readable medium described herein, the relay UE may be selected from the set of multiple candidate relay UEs based on an existing communication sidelink between the first UE and the relay UE.

In some examples of the method, apparatuses, and non-transitory computer-readable medium described herein, the relay UE may be selected from the set of multiple candidate relay UEs via a machine learning algorithm based on the one or more existing sidelink relay communication links at the relay UE, the one or more candidate target UEs associated with the relay UE, the one or more existing communication sidelinks between the first UE and the set of multiple candidate relay UEs, or any combination thereof.

In some examples of the method, apparatuses, and non-transitory computer-readable medium described herein, the relay UE may be selected from the set of multiple candidate relay UEs via a machine learning algorithm based on a first set of beams at the first UE, a second set of beams at the relay UE, a multi-panel communication capability associated with the relay UE, a multi-beam communication capability associated with the relay UE, a power state of the first UE, a power state of the second UE, or any combination thereof.

Some examples of the method, apparatuses, and non-transitory computer-readable medium described herein may further include operations, features, means, or instructions for receiving, from the base station, a third control signal that deactivates the sidelink relay communication link based on the one or more existing sidelink relay communication links at the relay UE, the one or more candidate target UEs associated with the relay UE, the one or more existing communication sidelinks between the first UE and the set of multiple candidate relay UEs, or any combination thereof.

In some examples of the method, apparatuses, and non-transitory computer-readable medium described herein, where the first control signal indicates a set of multiple sidelink relay communication links for communicating messages between a set of multiple target UEs and the base station via the relay UE, the set of multiple target UEs including the first UE and where the second control signal activates the set of multiple sidelink relay communication links between for the set of multiple target UEs.

In some examples of the method, apparatuses, and non-transitory computer-readable medium described herein, the message including the indication of the relay UE includes the first control signal, the second control signal, or both.

In some examples of the method, apparatuses, and non-transitory computer-readable medium described herein, the first control signal includes an RRC message and the second control signal includes a DCI message, a MAC-CE message, or both.

A method is described. The method may include communicating a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, transmitting, to the first UE, the relay UE, or both, and based on the identification of the relay UE, a first control signal indicating a sidelink relay communication link for communicating messages between the first UE and the base station via the relay UE, transmitting, to the first UE, the relay UE, or both, a second control signal that activates the sidelink relay communication link indicated via the first control signal, and communicating, via the sidelink relay communication link, a message to or from the first UE via the relay UE.

An apparatus is described. The apparatus may include a processor, memory coupled with the processor, and instructions stored in the memory. The instructions may be executable by the processor to cause the apparatus to communicate a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, transmit, to the first UE, the relay UE, or both, and based on the identification of the relay UE, a first control signal indicating a sidelink relay communication link for communicating messages between the first UE and the base station via the relay UE, transmit, to the first UE, the relay UE, or both, a second control signal that activates the sidelink relay communication link indicated via the first control signal, and communicate, via the sidelink relay communication link, a message to or from the first UE via the relay UE.

Another apparatus is described. The apparatus may include means for communicating a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, means for transmitting, to the first UE, the relay UE, or both, and based on the identification of the relay UE, a first control signal indicating a sidelink relay communication link for communicating messages between the first UE and the base station via the relay UE, means for transmitting, to the first UE, the relay UE, or both, a second control signal that activates the sidelink relay communication link indicated via the first control signal, and means for communicating, via the sidelink relay communication link, a message to or from the first UE via the relay UE.

A non-transitory computer-readable medium storing code is described. The code may include instructions executable by a processor to communicate a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, transmit, to the first UE, the relay UE, or both, and based on the identification of the relay UE, a first control signal indicating a sidelink relay communication link for communicating messages between the first UE and the base station via the relay UE, transmit, to the first UE, the relay UE, or both, a second control signal that activates the sidelink relay communication link indicated via the first control signal, and communicate, via the sidelink relay communication link, a message to or from the first UE via the relay UE.

Some examples of the method, apparatuses, and non-transitory computer-readable medium described herein may further include operations, features, means, or instructions for selecting the relay UE from the set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, where communicating the message including the identification of the relay UE includes transmitting the message to the base station.

Some examples of the method, apparatuses, and non-transitory computer-readable medium described herein may further include operations, features, means, or instructions for receiving, from the relay UE, an uplink message including an indication of the one or more existing sidelink relay communication links at the relay UE, the one or more candidate target UEs associated with the relay UE, or both, where selecting the relay UE may be based on receiving the sidelink message.

In some examples of the method, apparatuses, and non-transitory computer-readable medium described herein, communicating the message may include operations, features, means, or instructions for transmitting, to the first UE, the relay UE, or both, the message including the identification of the relay UE.

Some examples of the method, apparatuses, and non-transitory computer-readable medium described herein may further include operations, features, means, or instructions for receiving, from the first UE, the relay UE, or both, a UE assistance information message including an indication of the one or more existing communication sidelinks between the first UE and the set of multiple candidate relay UEs, where transmitting the message including the identification of the relay UE may be based on receiving the UE assistance information message.

Some examples of the method, apparatuses, and non-transitory computer-readable medium described herein may further include operations, features, means, or instructions for receiving, from the first UE, a request to establish the sidelink relay communication link with relay UE and transmitting, in response to the request, the message including the identification of the relay UE to the first UE, the relay UE, or both.

In some examples of the method, apparatuses, and non-transitory computer-readable medium described herein, the relay UE may be selected from the set of multiple candidate relay UEs based on a first set of beams at the relay UE used for wireless communications via the one or more existing sidelink relay communication links at the relay UE.

In some examples of the method, apparatuses, and non-transitory computer-readable medium described herein, communicating the message to or from the first UE via the sidelink relay communication link may include operations, features, means, or instructions for communicating the message via a second set of beams, where the second set of beams may be determined based on the first set of beams.

In some examples of the method, apparatuses, and non-transitory computer-readable medium described herein, the relay UE may be selected from the set of multiple candidate relay UEs based on a first channel quality associated with a sidelink channel between the first UE and the relay UE, a second channel quality associated with a wireless channel between the relay UE and the base station, or both.

In some examples of the method, apparatuses, and non-transitory computer-readable medium described herein, the relay UE may be selected from the set of multiple candidate relay UEs based on an existing communication sidelink between the first UE and the relay UE.

Some examples of the method, apparatuses, and non-transitory computer-readable medium described herein may further include operations, features, means, or instructions for transmitting, to the first UE, the relay UE, or both, a third control signal that deactivates the sidelink relay communication link based on the one or more existing sidelink relay communication links at the relay UE, the one or more candidate target UEs associated with the relay UE, the one or more existing communication sidelinks between the first UE and the set of multiple candidate relay UEs, or any combination thereof.

In some examples of the method, apparatuses, and non-transitory computer-readable medium described herein, where the first control signal indicates a set of multiple sidelink relay communication links for communicating messages between a set of multiple target UEs and the base station via the relay UE, the set of multiple target UEs including the first UE and where the second control signal activates the set of multiple sidelink relay communication links between for the set of multiple target UEs.

In some examples of the method, apparatuses, and non-transitory computer-readable medium described herein, the first control signal includes an RRC message and the second control signal includes a DCI message, a MAC-CE message, or both.

A method is described. The method may include communicating a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, receiving, from the base station based on the identification of the relay UE, a first control signal indicating a sidelink relay communication link for communicating messages between the first UE and the base station via the relay UE, receiving, from the base station, a second control signal that activates the sidelink relay communication link indicated via the first control signal, and communicating a message from the base station to the first UE, from the first UE to the base station, or both.

An apparatus is described. The apparatus may include a processor, memory coupled with the processor, and instructions stored in the memory. The instructions may be executable by the processor to cause the apparatus to communicate a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, receive, from the base station based on the identification of the relay UE, a first control signal indicating a sidelink relay communication link for communicating messages between the first UE and the base station via the relay UE, receive, from the base station, a second control signal that activates the sidelink relay communication link indicated via the first control signal, and communicate a message from the base station to the first UE, from the first UE to the base station, or both.

Another apparatus is described. The apparatus may include means for communicating a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, means for receiving, from the base station based on the identification of the relay UE, a first control signal indicating a sidelink relay communication link for communicating messages between the first UE and the base station via the relay UE, means for receiving, from the base station, a second control signal that activates the sidelink relay communication link indicated via the first control signal, and means for communicating a message from the base station to the first UE, from the first UE to the base station, or both.

A non-transitory computer-readable medium storing code is described. The code may include instructions executable by a processor to communicate a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, receive, from the base station based on the identification of the relay UE, a first control signal indicating a sidelink relay communication link for communicating messages between the first UE and the base station via the relay UE, receive, from the base station, a second control signal that activates the sidelink relay communication link indicated via the first control signal, and communicate a message from the base station to the first UE, from the first UE to the base station, or both.

DETAILED DESCRIPTION

Figure 1:
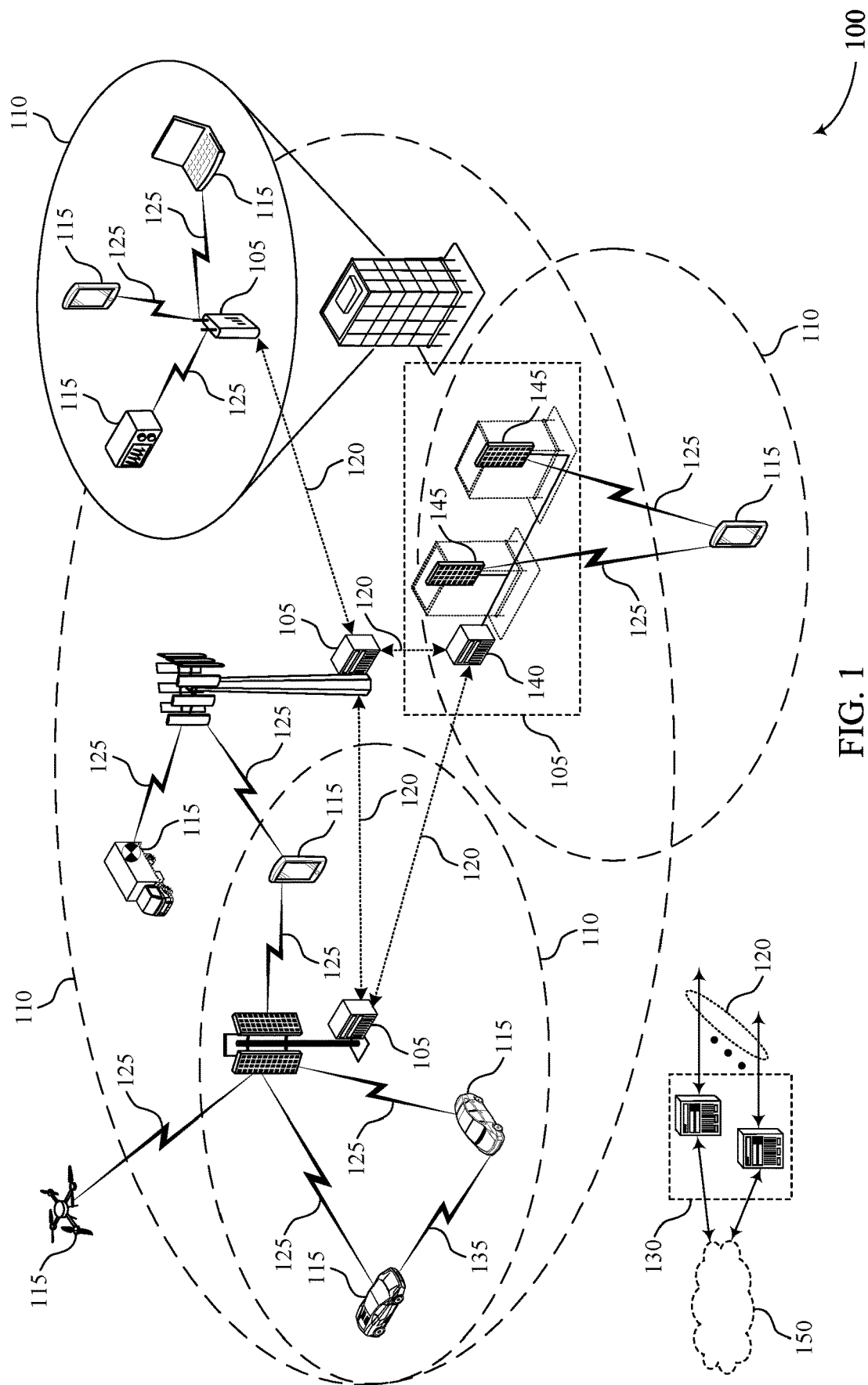
FIG. 1 illustrates an example of a wireless communications system that supports techniques for joint user equipment (UE) relay selection and activation in accordance with various aspects of the present disclosure.

Some wireless systems may support communications between the network (e.g., base stations) and user equipments (UEs) (e.g., uplink and downlink communications), as well as communications between multiple UEs (e.g., sidelink communications). In some cases, a communications link between a base station and a UE may become impaired and/or blocked. Link diversity may be improved through the use of sidelink relay communication links, in which a relay UE relays communications between a target UE and the base station. Conventional techniques for selecting, activating, and deactivating sidelink relay communication links often result in an inefficient use of resources, or the activation of inefficient/unreliable sidelink relay communication links. For example, conventional techniques for selecting and activating sidelink relay communication links may not take into account which UEs are actively serving as a relay UE, or existing sidelink connections at the respective target/relay UEs. This may result in increased power consumption at selected relay UEs, and inefficient and/or unreliable relay links.

Accordingly, techniques described herein are directed toward parameters and signaling which are used to select relay UEs for establishment of relay communication links. In particular, aspects of the present disclosure support signaling and other configurations which enable wireless devices (e.g., base station, target UE, relay UE) to select a relay UE from a set of candidate relay UEs based on (1) presence of existing and/or potential sidelink relay communication links at the candidate relay UEs, (2) candidate/potential target UEs servable by the candidate relay UEs, (3) existing sidelink connections between the target UE and the candidate relay UEs, or any combination thereof. By taking into account existing sidelink relay communication links at the candidate relay UEs and existing sidelink connections at the target UE, techniques described herein may prevent unduly increasing power consumption at selected relay UEs, and improve the efficiency of selected sidelink relay communication links. Upon selecting a relay UE from the set of candidate relay UEs, a sidelink relay communication link with the selected relay UE may be configured via Layer 3 (L3) signaling (e.g., radio resource control (RRC) signaling), and may be activated via Layer 1 (L1) and/or Layer 2 (L2) signaling (e.g., downlink control information (DCI) signaling, medium access control-control element (MAC-CE) messaging).

In some cases, UE assistance information exchanged between target UEs, relay UEs, and/or the network may enable the respective device(s) to select a relay UE from a set of candidate relay UEs. UE assistance information may include indications of existing sidelink relay communication links (e.g., whether each candidate relay UE is actively serving as a relay UE), neighboring UEs, beam information associated with existing sidelink connections, and the like. Such UE assistance information may facilitate efficient selection of relay UEs in order to establish sidelink relay communication links for multiple UEs within a wireless communication network which will not interfere with existing communication links between respective devices.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for joint UE relay selection and activation.

FIG. 1 illustrates an example of a wireless communications system 100 that supports techniques for joint UE relay selection and activation in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may be configured to support parameters and signaling which are used to select relay UEs 115 for establishment of relay communication links (e.g., sidelink relay communication links). In particular, the wireless communications system 100 may support signaling and other configurations which enable wireless devices (e.g., base stations 105, target UEs 115, relay UEs 115) to select a relay UE 115 from a set of candidate relay UEs 115 based on (1) presence of existing and/or potential sidelink relay communication links at the candidate relay UEs 115, (2) candidate/potential target UEs 115 servable by the candidate relay UEs 115, (3) existing sidelink connections between the target UE 115 and the candidate relay UEs 115, or any combination thereof. Upon selecting a relay UE 115 from the set of candidate relay UEs 115, a sidelink relay communication link with the selected relay UE may be configured via L3 signaling (e.g., RRC signaling), and may be activated via L1/L2 signaling (e.g., DCI, MAC-CE).

In some cases, UE assistance information exchanged between target UEs 115, relay UEs 115, and/or the network may enable the respective device(s) to select a relay UE 115 from the set of candidate relay UEs 115. UE assistance information may include indications of existing sidelink relay communication links (e.g., whether each candidate relay UE 115 is actively serving as a relay UE 115), neighboring UEs 115, beam information associated with existing sidelink connections, and the like. Such UE assistance information may facilitate efficient selection of relay UEs 115 in order to establish sidelink relay communication links for multiple UEs 115 within the wireless communications system 100 which will not interfere with existing communication links between respective devices.

Techniques described herein may enable more efficient configuration and activation of sidelink relay communication links, which may enable more widespread use of sidelink relay communication links between UEs 115. In particular, by taking into account existing sidelink relay communication links at the candidate relay UEs 115 and existing sidelink connections at the target UE 115, techniques described herein may prevent unduly increasing power consumption at selected relay UEs 115, and improve the efficiency of selected sidelink relay communication links. Moreover, by enabling more efficient and widespread use of sidelink relay communication links, techniques described herein may improve link diversity between UEs 115 and base stations 105, thereby facilitating more reliable wireless communications within the wireless communications system 100. Further, improved use of sidelink relay communication links may reduce power consumption at target UEs 115 (e.g., remote UEs 115).

Figure 2:
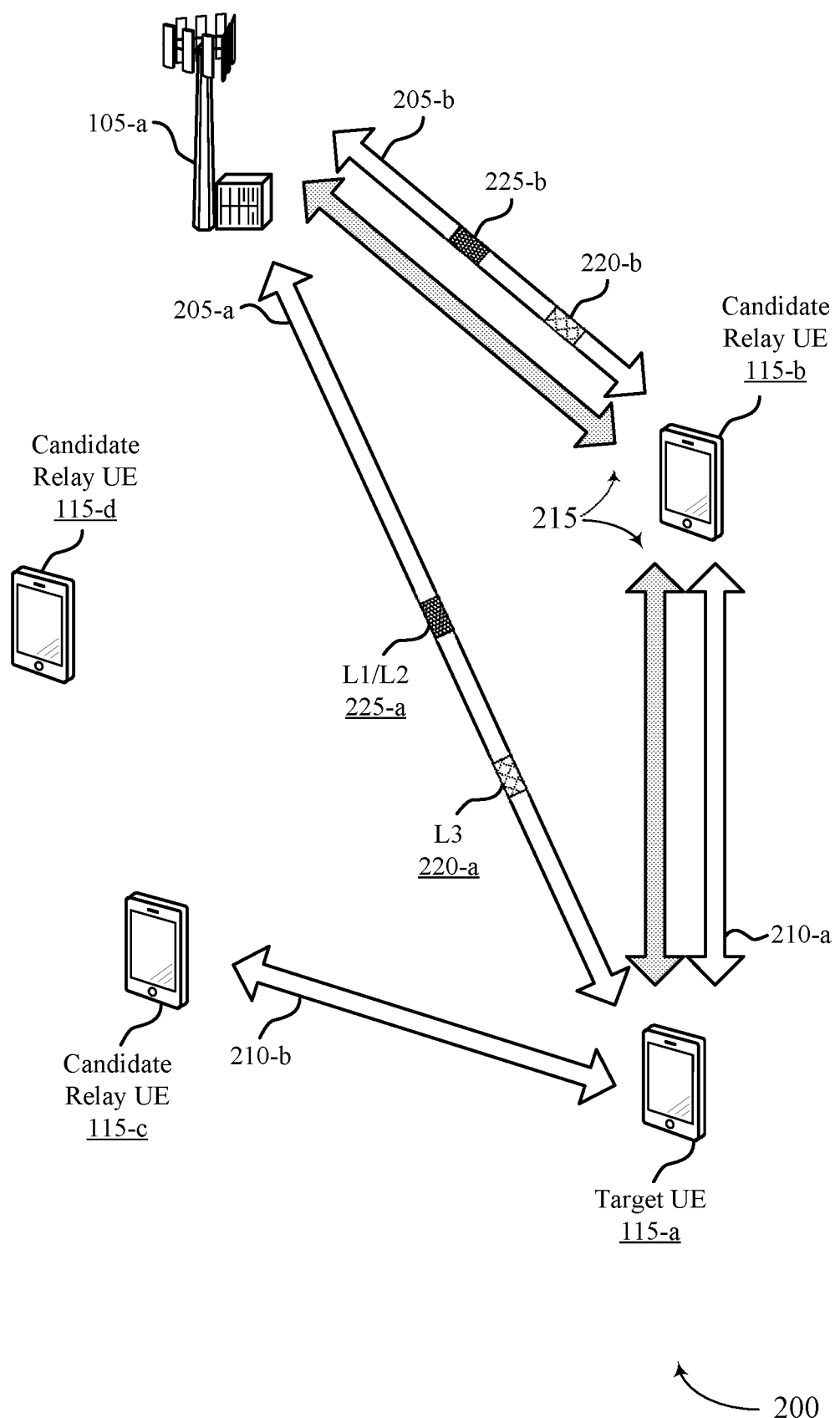
FIG. 2 illustrates an example of a wireless communications system that supports techniques for joint UE relay selection and activation in accordance with various aspects of the present disclosure.

FIG. 2 illustrates an example of a wireless communications system 200 that supports techniques for joint UE relay selection and activation in accordance with various aspects of the present disclosure. In some aspects, aspects of the wireless communications system 200 may implement, or be implemented by, aspects of the wireless communications system 100. The wireless communications system 200 may include a base station 105, a first UE 115-*a*, a second UE 115-*b*, a third UE 115-*c*, and a fourth UE 115-*d*, which may be examples of UEs 115, base stations 105, and other wireless devices as described with reference to FIG. 1. In particular, the first UE 115-*a* illustrated in FIG. 2 may be referred to as a remote UE 115-*a* or a target UE 115-*a*, whereas the second UE 115-*b*, third UE 115-*c*, and fourth UE 115-*d* may be referred to as candidate relay UEs 115.

The respective UEs 115 may communicate with the base station 105 using communication links 205. For example, as shown in FIG. 2, the first UE 115-*a* may communicate with the base station 105 via a communication link 205-*a*, and the second UE 115-*b* may communicate with the base station 105 via a communication link 205-*b*. As such, the base station 105 may serve as a common serving base station 105 for the respective UEs 115. The communication links 205-*a* and 205-*b* may include examples of NR or LTE links between the UEs 115 and the base station 105. In some cases, the communication links 205-*a* and 205-*b* may include examples of access links (e.g., Uu links) which may include bi-directional links which enable both uplink and downlink communication. For example, the first UE 115-*a* may transmit uplink signals, such as uplink control signals or uplink data signals, to the base station 105 using the communication link 205-*a*, and the base station 105 may transmit downlink signals, such as downlink control signals or downlink data signals, to the first UE 115-*a* using the communication link 205-*a*.

In some aspects, the various UEs 115 may communicate with one another via communication links 210. For example, the first UE 115-*a* may communicate with the second UE 115-*b* via a communication link 210-*a*, and may communicate with the third UE 115-*c* via a communication link 210-*b*. The communication links 210-*a*, 210-*b* may include examples of sidelink communication links or PC5 links between the first UE 115-*a* and the respective UEs 115-*b*, 115-*c*. As such, the communication links 210-*a*, 210-*b* may be based on a PC5 interface between the respective UEs 115. Additionally, or alternatively, the communication links 210-*a*, 210-*b* may be based on other interfaces or wireless communications, including Wi-Fi, Bluetooth, and the like.

In this regard, the UEs 115 of the wireless communications system 200 may be configured to communicate in a dual-connectivity mode which facilitates communications with multiple wireless devices (e.g., multiple wireless nodes). For example, the first UE 115-*a* may operate in a dual connectivity mode including two simultaneous communication stacks (e.g., PHY-to-RLC communication stacks) and a common PDCP. In particular, the first UE 115-*a* may communicate using a first communication stack for the communication link 205-*a* with the base station 105 and a second communication stack for the communication link 210-*a* with the second UE 115-*b*.

In some aspects, the first UE 115-*a*, the second UE 115-*b*, and the base station 105 may further be communicatively coupled via a sidelink relay communication link 215 (e.g., relay link, sidelink relay). In some aspects, the second UE 115-*b* (e.g., relay UE 115-*b*) may be configured to forward, or relay, wireless communications between the base station 105 and the first UE 115-*a* (e.g., target or remote UE 115-*a*) via the sidelink relay communication link 215. For the purposes of the present disclosure, the term "target UE 115" and "remote UE 115" may be used interchangeably to refer to a UE 115 which is in need of relaying service, whereas the term "relay UE 115" may be used to refer to a UE 115 which will "relay" communications between a target UE 115 and another wireless device (e.g., base station 105).

For example, the first UE 115-*a* may be configured to transmit data to the second UE 115-*b* via the sidelink relay communication link 215, and the second UE 115-*b* may be configured to forward (e.g., relay) the data received from the first UE 115-*a* to the base station 105 via the sidelink relay communication link 215. Conversely, the base station 105 may be configured to transmit data (e.g., downlink signals) to the second UE 115-*b* via the sidelink relay communication link 215, and the second UE 115-*a* may be configured to forward (e.g., relay) the data received from the base station 105 to the first UE 115-*a* via the via the sidelink relay communication link 215. Thus, the first UE 115-*a* (e.g., target UE 115-*a*) and the second UE 115-*b* (e.g., relay UE 115-*b*) may communicate using two links: a Uu link toward the serving base station 105, and a sidelink between the respective UEs 115. While the UEs 115-*a*, 115-*b* associated with the sidelink relay communication link 215 are shown and described as including independent wireless devices, the UEs 115-*a*, 115-*b* may additionally or alternatively include a combination of related devices (e.g., smart watch, laptop, smart glasses, phone, etc.).

In some aspects, the use of sidelink relays (e.g., sidelink relay communication link 215) may enable remote UEs 115 (e.g., first UE 115-*a*) to reduce a transmission power of uplink transmissions, thereby reducing a power consumption at the remote UEs 115. For example, in cases where the second UE 115-*b* is closer to the first UE 115-*a* as compared to the base station 105, the first UE 115-*a* may be able to transmit data to the second UE 115-*b* for relay to the base station 105 with a lower transmission power as compared to transmitting data directly to the base station 105 via the communication link 205. The use of sidelink relays (e.g., sidelink relay communication link 215) may improve link diversity (e.g., link selection or aggregation), which may improve a reliability of wireless communications within the wireless communications system 200.

Improved link diversity may be particularly important in the context of higher frequency communications, such as communications in FR2, as Uu links in FR2 may be particularly susceptible to impaired and/or blocked links. Furthermore, link diversity may be advantageous when a serving data rate/throughput is not sufficient (e.g., data rate of communication link 205-*a* is insufficient), or in cases where there is a need for traffic offload from a primary communication link. As such, the concept of sidelink relay communication links (e.g., relay links, relay sidelinks) may be utilized to provide link diversity, coverage enhancement, and power consumption reduction.

Relay communication link selection and aggregation may be facilitated by the serving base station 105. In other words, the selection of which candidate relay UE 115 will serve as a relay UE 115, and an activation of the sidelink relay communication link 215 with the selected relay UE 115, may be facilitated by the base station 105. In general, the selection of the relay UE 115 (e.g., selecting which candidate relay UE 115 will be used as a relay UE 115 for the target UE 115-*a*) may be performed by the base station 105, based on coordination/negotiation between the target UE 115-*a* and the respective candidate relay UEs 115, or both. The decision/selection of a relay UE 115 from a set of candidate relay UEs 115 may be based on any number of parameters or characteristics.

Parameters/characteristics which may be used to select a relay UE 115 from a set of candidate relay UEs 115 may include, but are not limited to, a capability of the respective candidate UE 115 to serve as a relay UE 115, channel quality of Uu/sidelink communication links at the candidate relay UEs 115, willingness of respective candidate relay UEs 115 to serve as a relay, available power (e.g., PHR) of the candidate relay UEs 115, multi-panel and/or multi-beam capability of the candidate relay UEs 115, Uu/sidelink serving beam correlation/interference at the candidate relay UEs 115, a location of the respective candidate relay UEs 115, traffic load on Uu/sidelink at the candidate relay UEs 115, DRX configuration/ability to coordinate on sidelink and/or Uu, RRC states at the respective candidate relay UEs 115, or any combination thereof. For example, when selecting a relay UE 115 for the target UE 115-*a*, the base station 105 may consider relative locations of the respective candidate relay UEs 115-*b*, 115-*c*, 115-*d*, channel conditions at the respective candidate relay UEs 115-*b*, 115-*c*, 115-*d*, multi-beam and multi-panel capabilities at the respective candidate relay UEs 115-*b*, 115-*c*, 115-*d*, and the like.

Upon selecting a relay UE 115, and to facilitate more dynamic relaying function, L3 signaling (e.g., RRC signaling) may be used to may configure/setup the relaying link (or equivalently the relay UE 115 for a particular connection), while L1/L2 signaling may be used to activate/deactivate the relaying link (or the corresponding relay UE 115). For example, upon selecting the second UE 115-*b* to be a relay UE 115-*b* for the first UE 115-*a*, the sidelink relay communication link 215 may be configured via RRC signaling, and may be activated via L1/L2 signaling (e.g., DCI, MAC-CE). The L1/L2 signaling for activation/deactivation of the sidelink relay communication link 215 may be defined for direct link (e.g., Uu) as signaling between the target UE 115-*a*/relay UE 115-*b* and the serving base station 105, for sidelink as signaling where the activation/deactivation signaling is relayed from the base station 105 or originated at the target UE 115-*a*/relay UE 115-*b*, or both. That is, the target UE 115-*a* may receive the L1/L2 signaling that activates the sidelink relay communication link 215 directly via the communication link 205-*a* and/or as a relayed message from the relay UE 115-*b* (e.g., via sidelink relay communication link 215 and/or communication links 205-*b* and 210-*a*).

Moreover, while the sidelink relay communication link 215 is in the deactivated state (e.g., prior to activation), the UEs 115 and the base station 105 may assume that there is no transmission or reception of data and control information (e.g., grants scheduling communications on the sidelink relay communication link 215, BSR, power headroom report (PHR), CSI feedback) on the communication links 205 and/or the communication link 210 which is associated with the sidelink relay communication link 215. In cases where the target UE 115-*a* and the relay UE 115-*b* have on-going sidelink communications independent of the sidelink relay communication link 215 (e.g., independent sidelink communications via communication link 210-*a*), only the sidelink relay communication link 215 is impacted by the activation/deactivation (e.g., sidelink communication link 210-*a* is not impacted by activation/deactivation of the sidelink relay communication link 215). In other words, the activation/deactivation of the sidelink relay communication link 215 is selective.

As noted previously herein, some conventional techniques for selecting, activating, and deactivating sidelink relay communication links often result in an inefficient use of resources, or the activation of inefficient/unreliable sidelink relay communication links. For example, conventional techniques for selecting and activating sidelink relay communication links 215 may not take into account which candidate relay UEs 115 are actively serving as a relay UE 115, or existing sidelink connections at the respective target/relay UEs 115. This may result in increased power consumption at selected relay UEs, and inefficient and/or unreliable relay links.

Accordingly, the UEs 115 and the base station 105 of the wireless communications system 200 may support parameters and signaling which are used to select relay UEs 115 for establishment of sidelink relay communication links 215. In particular, the respective wireless devices of the wireless communications system 200 may support signaling and other configurations which enable wireless devices (e.g., base station 105, target UE 115-*a*, relay UE 115) to select a relay UE 115 from a set of candidate relay UEs 115 (e.g. select one of the second UE 115-*b*, third UE 115-*c*, or fourth UE 115-*d*) based on (1) presence of existing and/or potential sidelink relay communication links at the candidate relay UEs 115, (2) candidate/potential target UEs 115 servable by each of the respective candidate relay UEs 115, (3) existing sidelink connections between the target UE 115 and the candidate relay UEs 115, or any combination thereof.

By taking into account existing (or potential) sidelink relay communication links at the candidate relay UEs 115 and existing sidelink connections at the target UE 115-*a*, techniques described herein may prevent unduly increasing power consumption at selected relay UEs 115, and improve the efficiency of selected sidelink relay communication links. Upon selecting a relay UE 115 from the set of candidate relay UEs 115, the sidelink relay communication link 215 with the selected relay UE 115 may be configured via RRC signaling, and may be activated via L1/L2 signaling (e.g., DCI, MAC-CE).

For example, the second UE 115-*b*, the third UE 115-*c*, and the fourth UE 115-*d* may be considered to be "candidate" relay UEs 115 for relaying wireless communications between the target UE 115-*a* and the base station 105. In such cases, as described previously herein, a wireless device of the wireless communication system 200 (e.g., base station 105, target UE 115-*b*, relay UE 115) may be configured to select one of the candidate relay UEs 115-*b*, 115-*c*, 115-*d* to serve as the relay UE 115 for the target UE 115-*a*. In some cases, a relay UE 115 may be selected from the set of candidate relay UEs 115-*b*, 115-*c*, 115-*d* based on the state of the respective candidate relay UEs 115 with respect to other UEs 115.

For instance, in some cases, a wireless device (e.g., base station 105, target UE 115-*a*, relay UE 115-*a*) may select/activate a candidate/deactivated relay UE 115 that already serves other target UEs 115, and therefore it is already active and so adding this relaying service may not add much to its power consumption. In other words, preference may be given to candidate relay UEs 115 that are already actively serving as a relay UE 115 to one or more other target UEs 115. For example, the target UE 115-*a* and/or base station 105 may identify that the second UE 115-*b* is actively serving as a relay UE 115-*b* for the third UE 115-*c* (e.g., existing sidelink relay communication link 215 between the base station 105, the second UE 115-*b*, and the third UE 115-*c*), and that the third and fourth UEs 115-*c*, 115-*d* are not actively serving as relay UEs 115 for any other target UEs 115. In this example, the second UE 115-*b* may be selected to serve as the relay UE 11-*b* for the first UE 115-*a* based on the other existing sidelink relay communication link 215 at the second UE 115-*b* (e.g., based on the second UE 115-*b* already serving as a relay UE 115).

In some cases, beam correlation (e.g., potential interference of beams at the respective candidate relay UEs 115) may be considered when selecting the relay UE 115 from the set of candidate relay UEs 115. In cases where the selected relay UE 115 is multi-panel capable (e.g., capable of simultaneously communicating via multiple antenna panels), correlation of the beams used for the target UE 115-*a* and other served target UEs 115 may be considered. A combination of specific beam pairs for may be preferred from the beam interference point of view, as the interfering beam pairs may significantly degrade performance. For example, the second UE 115-*b* may relay communications for the third UE 115-*c* via a first set of beams. In this example, a second set of beams used/selected to relay communications for the first UE 115-*a* may be based on the first set of beams used for relaying communications for the third UE 115-*c*. In particular, the second set of beams used for relaying communications for the first UE 115-*a* may be selected/determined so as to not interfere (or be interfered with) communications performed via the first set of beams used to relay communications for the third UE 115-*c*.

In additional or alternative implementations, channel qualities at the respective candidate relay UEs 115 may be used to select which relay UE 115 from the set of candidate relay UEs 115-*b*, 115-*c*, 115-*d* will serve as the relay UE 115. In other words, actual channel qualities on communication sidelinks (e.g., communication sidelinks between the candidate relay UEs 115 and the target UE 115-*a*) and/or actual channel qualities on Uu links (e.g., Uu links between the base station 105 and the candidate relay UEs 115) may be considered when selecting the relay UE 115 that is to be used. In some cases, techniques described herein may prioritize selection/activation of a candidate relay UE 115 that is already active on sidelink if an associated channel quality (e.g., sidelink channel quality, Uu channel quality) of the candidate relay UE 115 is above a respective threshold, exhibits a channel quality which is greater than a channel quality of a currently-used link by some threshold.

For example, in cases where the base station 105 selects the relay UE 115 that is to be used, the base station 105 may select the second UE 115-*b* from the set of candidate relay UEs 115 based on a channel quality associated with the communication link 210-*a* between the relay UE 115-*b* and the target UE 115-*a*, based on a channel quality associated with the communication link 205-*b* between the base station 105 and the relay UE 115-*b*, or both. In particular, the base station 105-*b* may select the second UE 115-*b* based on the channel qualities of the communication links 210-*a*, 205-*b* satisfying (e.g., exceeding) one or more thresholds, being greater than channel qualities of communication links at the other candidate relay UEs 115, or both.

In some implementations, techniques described herein may select a relay UE 115 from the set of candidate relay UEs 115 based on candidate/potential target UEs 115 which are servable by the respective candidate relay UEs 115. In other words, techniques described herein may be used to select a relay UE 115 which is able to serve multiple target UEs 115. Even if a respective candidate relay UE 115 is not currently serving any target UEs 115, the respective candidate relay UE 115 may be considered and selected/activated based on a joint consideration for a group of target UEs 115. For example, the target UE 115-*a* may determine that the none of the candidate relay UEs 115-*b*, 115-*c*, 115-*d* are currently serving as a relay UE 115 (e.g., no existing sidelink relay communication links 215). In this example, the target UE 115-*a* may select the second UE 115-*b* based on determining that the second UE 115-*b* is able to serve more target UEs 115 as compared to the other candidate relay UEs 115-*c*, 115-*d*. In other words, the second UE 115-*b* may be selected based on the second UE 115-*b* being associated with more candidate/potential target UEs 115 that are servable by the second UE 115-*b*.

In additional or alternative implementations, techniques described herein may be used to select/activate/deactivate a candidate relay UE 115 based on a state of the respective candidate relay UE 115 with respect to the existence of other sidelink connection(s) (e.g., existing communication sidelinks) with the target UE 115. In other words, wireless devices (e.g., base station 105, target UE 115-*a*, relay UE 115) of the wireless communications system 200 may select a relay UE 115 from the set of candidate relay UEs 115-*b*, 115-*c*, 115-*d* based on existing communication sidelinks (communication links 210-*a*, 210-*b*) between the target UE 115-*a* and the respective candidate relay UEs 115. Stated differently, preference may be given to candidate relay UEs 115 which have an existing sidelink connections with the target UE 115-*a*.

For example, the base station 105 may select/activate the second UE 115-*b* from the set of candidate/deactivated relay UEs 115-*b*, 115-*c*, 115-*d* based on the second UE 115-*b* already having an active communication sidelink (e.g., communication link 210-*a*) with the target UE 115-*a* needing relaying service. In this example, the second UE 115-*b* is already active (e.g., has already established sidelink communications with the target UE 115-*a*), and so adding this relaying service may not add much to the power consumption at the second UE 115-*b*. When selecting a relay UE 115 based on existing sidelink connections with the target UE 115-*a*, different aspects of measurements, reporting, and beam sharing among the multiple sidelink service connections (e.g., existing sidelink communication links 210 with the target UE 115-*a*) may be utilized. For example, in cases where the second UE 115-*b* and the third UE 115-*c* both have existing communication sidelinks with the target UE 115-*a* (e.g., existing communication links 210-*a*, 210-*b*), the second UE 115-*b* may be selected as the relay UE 115-*b* based on the communication link 210-*a* exhibiting superior performance compared to the communication link 210-*b*.

In some implementations, the target UE 115-*a*, the candidate relay UEs 115-*b*, 115-*c*, 115-*d*, or any combination thereof, may transmit assistance information (e.g., UE assistance information messages) to one another and/or the base station 105 to facilitate joint relay UE 115 selection, activation, and deactivation. In other words, the respective UEs 115 may indicate (via UE assistance information) existing sidelink relay communication links at the respective candidate relay UEs 115, candidate/potential target UEs 115 servable by the candidate relay UEs 115, existing sidelink connections, or any combination thereof, in order to facilitate efficient selection of a candidate relay UE 115.

For example, in cases where the base station 105 is configured to select a relay UE 115 from the set of candidate relay UEs 115-*b*, 115-*c*, 115-*d*, the base station 105 may aggregate UE assistance information from the target UE 115-*a*, the respective candidate relay UEs 115-*b*, 115-*c*, 115-*d*, or both. For instance, the base station 105 may receive UE assistance information from the target UE 115-*a* which indicates existing communication sidelinks (e.g., existing communication links 210) between the target UE 115-*a* and respective candidate relay UEs 115. Further, the base station 105 may receive UE assistance information from the second UE 115-*b* that indicates existing sidelink relay communication links at the second UE 115-*b* (e.g., other target UEs 115 that the second UE 115-*b* is serving as a relay for), candidate/potential target UEs 115 that are servable by the second UE 115-*b*, existing communication sidelinks (communication links 210) between the second UE 115-*b* and other UEs 115, or any combination thereof. In this example, the base station 105 may utilize UE assistance information received from the target UE 115-*a* and/or the respective candidate relay UEs 115-*b*, 115-*c*, 115-*d* to select which of the candidate relay UEs 115 will serve as the relay UE 115 for the target UE 115-*a*.

In some cases, the target UE 115-*a* and/or a candidate relay UE 115 may be configured to request establishment of a sidelink relay communication link 215. In particular, UEs 115 may request establishment of a sidelink relay communication link 215 upon establishing communication sidelinks 210 (e.g., non-relaying sidelinks) with the target UE 115-*a*. In other words, the target UE 115-*b* may request/suggest the establishment of the sidelink relay communication link 215 based on the establishment of a sidelink connection (service other than relaying) with a candidate relay UE 115 that also has/may have relaying capability.

For example, upon establishing a communication sidelink (e.g., communication link 210-*a*) with the second UE 115-*b*, the target UE 115-*a* may transmit a request to the base station 105 to establish the sidelink relay communication link 215 with the second UE 115-*b*. Additionally, or alternatively, the request for establishment of the sidelink relay communication link 215 may be signaled when the target UE 115-*a* needs a relaying service, as a preemptive matter in cases the target UE 115-*a* will need relaying service in the future (e.g., regardless of current need for relaying service), or both.

In cases where the target UE 115-*a* and/or the second UE 115-*b* selects the second UE 115-*b* to serve as the relay UE 115-*b* for the target UE 115-*a*, the respective UE 115 may inform the base station 105 of the selection. Upon selection of a relay UE 115, L3 signaling may be used to indicate selection/configuration of the sidelink relay communication link 215, and L1/L2 signaling may be used for activation/deactivation of the sidelink relay communication link 215.

For example, upon selecting the second UE 115-*b* to serve as the relay UE 115-*b* for the target UE 115-*a* (or upon being informed of the selection), the base station 105 may transmit an L3 message 220-*a*, 220-*b* (e.g., first control message) to the target UE 115-*a*, the second UE 115-*b*, or both. The L3 message 220 may include an RRC message, and may be used to indicate/confirm selection of the second UE 115-*b* to serve as the relay UE 115-*b*, and configure the sidelink relay communication link 215 between the base station 105, the second UE 115-*b*, and the target UE 115-*a*.

In some aspects, the base station 105 may additionally utilize L1/L2 signaling for activating/deactivating the sidelink relay communication link 215. For example, as shown in FIG. 2, the base station 105 may transmit L1/L2 signaling 225-*a*, 225-*b* (e.g., DCI signaling, MAC-CE signaling) to the target UE 115-*a* and/or relay UE 115-*b* to activate the sidelink relay communication link 215. In some cases, the base station 105 may transmit the L1/L2 signaling 225 to both the target UE 115-*a* and the relay UE 115-*b*. Additionally, or alternatively, the base station 105 may transmit the L1/L2 signaling 225 to the relay UE 115-*b* via the sidelink relay communication link 215 along with an instruction for the relay UE 115-*b* to relay the L1/L2 signaling 225 to the target UE 115-*a*.

While the L3 signaling 220 and the L1/L2 signaling 225 are shown and described in FIG. 2 as including separate signaling/messages, this is not to be regarded as a limitation of the present disclosure, unless noted otherwise herein. For example, in some cases, the base station 105 may utilize a single control message for configuring and activating the sidelink relay communication link 215. In such cases, the L3 signaling 220 and the L1/L2 signaling 225 may include the same signaling/message.

In some aspects, the base station 105 may utilize joint signaling to configure, activate, and/or deactivate a candidate relay UE 115 as a relay UE 115 for multiple target UEs 115. In other words, the L3 signaling 220 and the L1/L2 signaling 225 may be used to configure and activate multiple sidelink relay communication links 215 at the second UE 115-*b* for relaying services for multiple target UEs 115 (including the target UE 115-*a*).

In some implementations, the joint relay UE 115 selection/activation/deactivation techniques described herein may be based on one or more prediction algorithms (e.g., conventional algorithms, machine learning-based algorithms). In other words, the target UE 115-a, base station 105, and/or relay UE 115-b may be configured to select the relay UE 115-b that will be used based on conventional and/or machine learning algorithms. In particular, parameters discussed herein may be input to one or more algorithms or classifiers (e.g., existing sidelink relay communication links, existing sidelink connections, candidate/potential target UEs 115 servable by the respective candidate relay UEs 115, link qualities, beam information), where the algorithms/classifiers are configured to select the relay UE 115 that is to be used from the set of candidate relay UEs 115 based on the received inputs.

In this regard, the joint prediction/selection of the relay UE 115 from the set of candidate relay UEs 115 may be based on considerations of multiple target UEs 115 needing service, multiple sidelink connections among pairs of UEs 115, channel conditions, beam considerations (e.g., correlation/interference/reuse of the same beam), capabilities of the candidate relay UEs 115 (e.g., number of serving UEs 115, sidelink connections, L1-L2 mobility, multi-beam capabilities, multi-panel capabilities, FDD capabilities), states of the target UE 115-a and/or candidate relay UEs 115, or any combination thereof.

Parameters discussed herein used for the selection/activation of sidelink relay communication links 215 (e.g., existing sidelink relay communication links 215 at candidate relay UEs 115, existing sidelink connections at the target UE 115-a, candidate/potential target UEs 115 servable by the candidate relay UEs 115, channel qualities, beam information) may additionally or alternatively be used/considered for the deactivation of relay UEs 115 (deactivation of sidelink relay communication links 215). In other words, the activated relay UE 115-b may be deactivated/deconfigured based on the joint consideration of multiple relaying links. For example, if the relay UE 115-b is providing relay services for only the target UE 115-a, or if the relay UE 115-b becomes unsuitable for multiple target UEs 115, the base station 105, relay UE 115-a, and/or target UE 115-b may determine to deactivate/deconfigure the relay UE 115-b. In such cases, the sidelink relay communication link 215 at the relay UE 115-b may be deactivated via L1/L2 signaling 225. In some aspects, a relay UE 115-b serving a group of target UEs 115 which is deactivated may be replaced by another relay UE 115 to serve the group.

Additionally, or alternatively, the activated relay UE 115-b may be deactivated/deconfigured based on the joint consideration of multiple active sidelink connections between respective pairs of UEs 115. For example, if the sidelink communication link 210-a between the target UE 115-a and the relay UE 115-b is to be terminated, the relaying service via the sidelink relay communication link 215 may be deactivated, terminated, or otherwise put on hold (e.g., the relay UE 115-b is deconfigured/deactivated for that specific target UE 115-a). In such cases, the relay UE 115-b serving the target UE 115-a may be replaced by another relay UE 115 (e.g., candidate relay UE 115-c, 115-d) that may have/want to establish a sidelink connection (separate from the relaying service) with the target UE 115-a.

Techniques described herein may enable more efficient configuration and activation of sidelink relay communication links, which may enable more widespread use of sidelink relay communication links between UEs 115. In particular, by taking into account existing sidelink relay communication links at the candidate relay UEs 115 and existing sidelink connections at the target UE 115, techniques described herein may prevent unduly increasing power consumption at selected relay UEs 115, and improve the efficiency of selected sidelink relay communication links. Moreover, by enabling more efficient and widespread use of sidelink relay communication links, techniques described herein may improve link diversity between UEs 115 and base stations 105, thereby facilitating more reliable wireless communications within the wireless communications system 100. Further, improved use of sidelink relay communication links may reduce power consumption at target UEs 115 (e.g., remote UEs 115).

Figure 3:
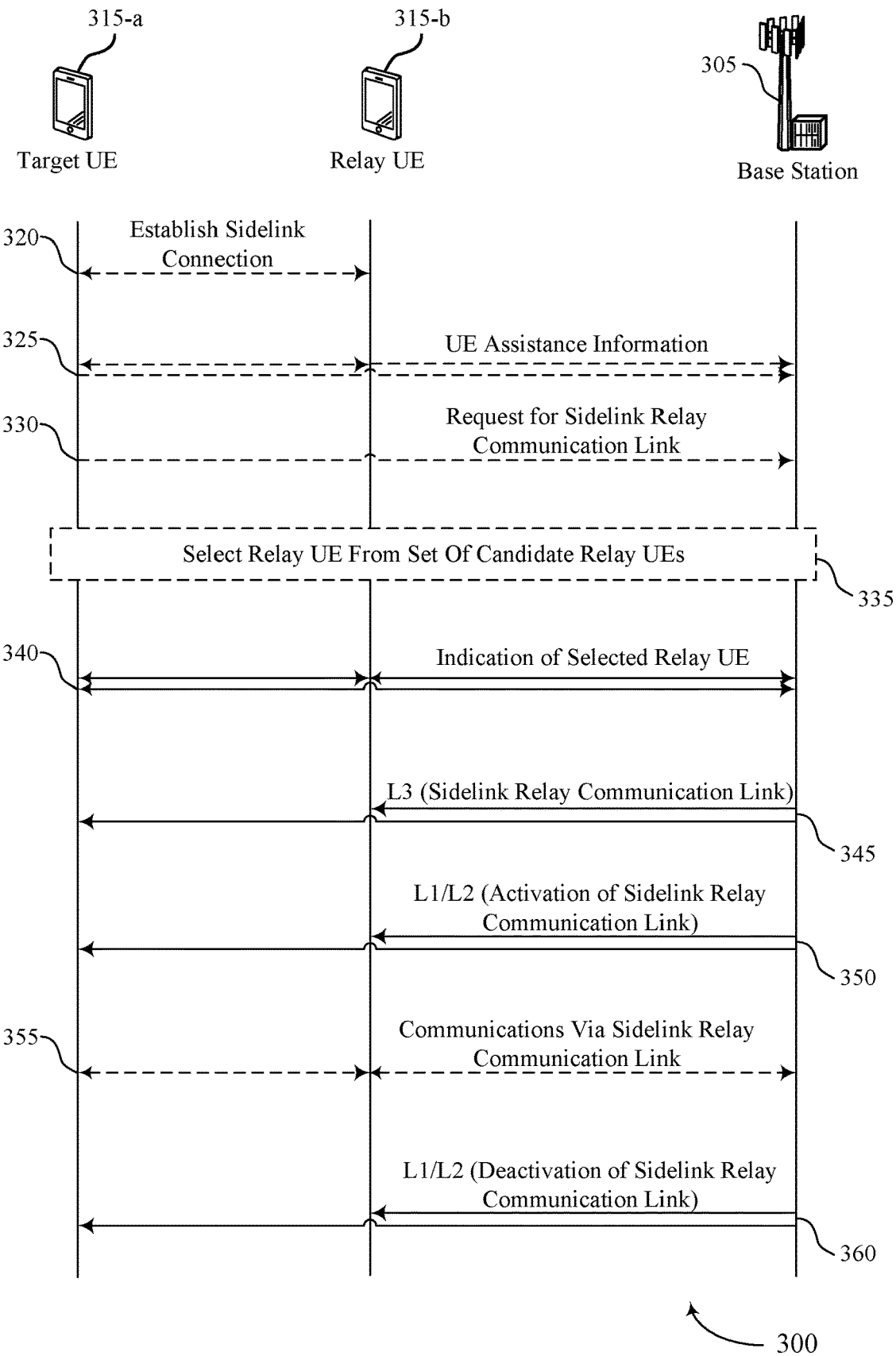
FIG. 3 illustrates an example of a process flow that supports techniques for joint UE relay selection and activation in accordance with various aspects of the present disclosure.

FIG. 3 illustrates an example of a process flow 300 that supports techniques for joint UE relay selection and activation in accordance with various aspects of the present disclosure. In some examples, process flow 300 may implement, or be implemented by, aspects of wireless communications system 100, wireless communications system 200, or both. For example, the process flow 300 may illustrate techniques which enable wireless devices (e.g., target UE 315-a, relay UE 315-b, base station 305) to select a candidate relay UE 315 from a set of candidate relay UEs 315 that will be used to relay wireless communications between the target UE 315-a and the base station 305, as described with reference to FIGS. 1-3.

In some cases, process flow 300 may include a first UE 315-a (e.g., target UE 315-a, remote UE 315-a), a second UE 315-b (e.g., relay UE 315-b), and a base station 305, which may be examples of corresponding devices as described herein. For example, in some cases, the target UE 315-a and the relay UE 315-b illustrated in FIG. 3 may be examples of the target UE 315-a and the relay UE 315-b, respectively, as illustrated in FIG. 2. Similarly, the base station 305 illustrated in FIG. 3 may be an example of the base station 305 illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

In some cases, the relay UE 315-b illustrated in FIG. 3 may be considered to be a "candidate" relay UE 315-b included within a set of candidate relay UEs 315 which may be used to provide relay services between the target UE 315-a and the base station 305. In this regard, the various steps and functions of the process flow 300 may be used to select the relay UE 315-b from the set of candidate relay UEs 315 in order to provide relay services between the target UE 315-a and the base station 305.

At 320, the target UE 315-a and the relay UE 315-b may establish a sidelink connection (e.g., communication sidelink, sidelink communication link 210) with one another. For example, in some cases, the target UE 315-a and the relay UE 315-b may establish a PC5 link with one another.

At 325, the target UE 315-a, the relay UE 315-b, or both, may transmit UE assistance information to one another, the base station 305, or both. In some aspects, the UEs 315 may transmit UE assistance information to one another and/or the base station 305 to facilitate selection of a relay UE 315 which will be used to relay wireless communications between the target UE 315-a and the base station 305.

UE assistance information that may be distributed to facilitate in the selection of the candidate relay UE 315 may include, but is not limited to, existing sidelink relay communication links at the respective candidate relay UEs 315, candidate/potential target UEs 315 servable by the respective candidate relay UEs 315, existing sidelink connections at the target UE 315-*a* and/or candidate relay UEs 315, channel qualities of communication links (e.g., Uu links, sidelinks) at the respective candidate relay UEs 315, beam information at the target UE 315 and/or candidate relay UEs 315, or any combination thereof. For example, UE assistance information transmitted by the target UE 315-*a* may include an indication of existing communication sidelinks between the target UE 315-*a* and candidate relay UEs 315. By way of another example, UE assistance information transmitted by the relay UE 315-*b* may indicate existing sidelink relay communication links at the relay UE 315-*b* (e.g., other target UEs 315 currently served by the relay UE 315), potential/candidate target UEs 315 for which the relay UE 315-*b* may provide relay services for, and the like.

UE assistance information may be used by the respective wireless devices (e.g., target UE 315-*a*, relay UE 315-*b*, base station 305) to select a candidate relay UE 315 from the set of candidate relay UEs 315. For example, in some cases, the relay UE 315-*b* may aggregate UE assistance information from the target UE 315-*a*, other candidate relay UEs 315, or both. In this example, the relay UE 315-*b* may utilize aggregated UE assistance information to select which candidate relay UE 315 will be selected to serve as a relay link for the target UE 315-*a*. For instance, in some cases, the relay UE 315-*b* may utilize aggregated UE assistance information to determine that the relay UE 315-*b* itself will be selected to serve as the relay link for the target UE 315-*a*. By way of another example, in other cases, the base station 305 may aggregate UE assistance information from the target UE 315-*a*, the relay UE 315-*b*, other candidate relay UEs 315, or any combination thereof, and may utilize aggregated UE assistance information to select a candidate relay UE 315 (e.g., relay UE 315-*b*) from the set of candidate relay UEs 315.

At 330, the target UE 315-*a* may transmit, to the base station 305, a request to establish a sidelink relay communication link with a candidate relay UE 315. In some cases, the target UE 315-*a* may transmit the request based on establishing the sidelink connection with the candidate relay UE 315-*b* at 320, transmitting/receiving UE assistance information at 325, or both. In some cases, the request may include a general request for establishment of a sidelink relay communication link. In other cases, the request may indicate a preferred candidate relay UE 315. For example, in some cases, the target UE 315-*a* may transmit the request upon establishing the communication sidelink with the relay UE 315-*b* at 320, where the request includes an indication of the relay UE 315-*b*.

At 335, the target UE 315-*a*, the relay UE 315-*b*, the base station 305, or any combination thereof, may select a relay UE 315 from the set of candidate relay UEs 315. For example, as shown in FIG. 3, the relay UE 315-*b* may be selected from the set of candidate relay UEs 315 to provide relay services between the target UE 315-*a* and the base station 305. The respective wireless devices (e.g., target UE 315-*a*, relay UE 315-*b*, base station 305) may select the relay UE 315-*b* from the set of candidate relay UEs 315 based on the establishment of the communication sidelink at 320, transmitting/receiving UE assistance information at 325, the request for the sidelink relay communication link at 330, or any combination thereof.

For example, as noted previously herein, the relay UE 315-*b* may be selected based on one or more existing sidelink relay communication links at the relay UE 315-*b*, existing communication sidelinks between the target UE 315-*a* and respective candidate relay UEs 315, or both. For instance, preference may be given to relay UEs 315 which include existing sidelink relay communication links (e.g., preference for relay UEs 315 that are already serving as a relay UE 315). By way of another example, the relay UE 315-*b* may be selected based on a first channel quality associated with a sidelink channel between the target UE 315-*a* and the relay UE 315-*b*, a second channel quality associated with a wireless channel between the relay UE 315-*b* and the base station 305, or both. Other parameters which may be used to select which relay UE 315 will be used may include multi-panel communication capabilities of the respective candidate relay UEs 315, multi-beam communication capabilities of the respective candidate relay UEs 315, power states of the target UE 315-*a* and/or candidate relay UEs 315, or any combination thereof.

Further, by way of another example, the relay UE 315-*b* may be selected based on beam information used at the target UE 315-*b*, the relay UE 315-*b*, or both. In particular, the relay UE 315-*b* may be selected such that beams used to relay communications for the target UE 315-*a* do not interfere with, or do not experience interference from, beams used for other communications at the target UE 315-*a* and/or relay UE 315-*b*. For instance, in cases where the relay UE 315-*b* provides relaying services for a second target UE 315 using a first set of beams, the relay UE 315-*b* may be selected based on being able to provide relaying services for the target UE 315-*a* using a second set of beams which will not interfere with, or do not experience interference from, the first set of beams.

In some implementations, the relay UE 315-*b* may be selected from the set of candidate relay UEs 315 (e.g., by the target UE 315-*a*, the relay UE 315-*b*, the base station 305) using a machine learning algorithm. In particular, the target UE 315-*a*, the relay UE 315-*b*, and/or the base station 305 may be configured to implement a machine learning algorithm in order to sect the relay UE 315-*b* from the set of candidate relay UEs 315. For example, in cases where the target UE 315-*a* is configured to select which relay UE 315 will be used, the target UE 315-*a* may input UE assistance information (e.g., existing sidelink relay communication links, candidate/potential target UEs 315, existing communication sidelinks, channel qualities, beam information, multi-panel communication capabilities, multi-beam communication capabilities, power states of UEs 315) into a machine learning algorithm, where the machine learning algorithm is configured to select a relay UE 315 from the set of candidate relay UEs 315 based on the inputted UE assistance information.

At 340, the target UE 315-*a*, the relay UE 315-*b*, the base station 305, or any combination thereof, may communicate (e.g., transmit, receive) a message including an identification of the relay UE 315-*b*. In this regard, each of the respective wireless devices (e.g., target UE 315-*a*, relay UE 315-*b*, base station 305) may transmit or receive a message which indicates that the relay UE 315-*b* was selected to establish a sidelink relay communication link between the target UE 315-*a* and the base station 305. The message at 340 may include a MAC-CE message, a DCI message, an uplink control information (UCI) message, or any combination thereof.

The respective wireless devices may communicate (e.g., transmit, receive) the message indicating the selected relay UE 315-*b* based on the establishment of the communication sidelink at 320, transmitting/receiving UE assistance information at 325, transmitting/receiving the request for the sidelink relay communication link at 330, selecting the relay UE 315-b at 335, or any combination thereof.

For example, in cases where the base station 305 selects the relay UE 315-b at 335, the base station 305 may transmit a message to the target UE 315-a, the relay UE 315-b (e.g., for relay to the target UE 315-a), or both, where the message(s) include an indication of the relay UE 315-b. By way of another example, in cases where the target UE 315-a selects the relay UE 315-b at 335, the target UE 315-a may transmit a message to the relay UE 315-b, the base station 305, or both, where the message(s) include an indication of the relay UE 315-b. By way of another example, in cases where the relay UE 315-b selects the relay UE 315-b at 335, the relay UE 315-b may transmit a message to the target UE 315-a, the base station 305, or both, where the message(s) include an indication of the relay UE 315-b.

At 345, the base station 305 may transmit a first control signal (e.g., L3 signaling) to the target UE 315-a, the relay UE 315-b, or both, where the first control signal indicates a sidelink relay communication link for communicating messages between the target UE 315-a and the base station 305 via the relay UE 315-b. In other words, the base station 305 may transmit L3 signaling (e.g., RRC signaling) which configures a sidelink relay communication link associated with the target UE 315-a and the relay UE 315-b. For example, the RRC signaling at 345 may configure a sidelink relay communication link 215, as shown and described in FIG. 2.

In some implementations, the first control signal (e.g., L3 signaling, RRC signaling) at 345 may be the same or different signaling as compared to the message indicating the selected relay UE 315-b at 340. For example, in some cases where the base station 305 selects the relay UE 315-b, the L3 signaling at 345 may include the indication of the selected relay UE 315-b, in which case the signaling at 340 and 345 may include the same control signal.

In some aspects, the first control signal (e.g., L3 signaling, RRC signaling) at 345 may include information associated with the sidelink relay communication link. Information associated with the sidelink relay communication link may include, but is not limited to, trigger conditions for activating and/or deactivating the sidelink relay communication link, parameters associated with activated/deactivated states of the sidelink relay communication link, a beam management configuration associated with the sidelink relay communication link, identifiers associated with wireless devices (e.g., target UE 315-a, relay UE 315-b, base station 305) associated with the sidelink relay communication link, and the like.

At 350, the base station 305 may transmit a second control signal (e.g., L1 signaling, L2 signaling) to the target UE 315-a, the relay UE 315-b, or both, where the second control signal activates the sidelink relay communication link which was configured/indicated via the first control signal at 345. In some aspects, the second control signal may be transmitted via L1 signaling, L2 signaling, or both. In this regard, the second control signal may include a DCI message, a MAC-CE message, or both.

In some implementations, the base station 305 may transmit the second control signal to the target UE 315-a and/or the relay UE 315-b via the communication links (e.g., Uu links) between the base station 305 and the respective UEs 315. In additional or alternative implementations, the base station 305 may transmit the second control signal to the target UE 315-a and/or the relay UE 315-b via the sidelink relay communication link, another sidelink communication link between the respective UEs 315, or both. For example, the base station 305 may transmit the second control signal to the relay UE 315-b via the sidelink relay communication link, and the relay UE 315-b may forward (e.g., relay) the second control signal to the target UE 315-a via the sidelink relay communication link.

The second control signaling may activate the sidelink relay communication link. As noted previously herein, L3 signaling (e.g., RRC signaling) at 345 may initially configure the sidelink relay communication link in the deactivated state such that it may be subsequently activated via L1/L2 signaling (e.g., the second control signal at 350). However, in additional or alternative implementations, the sidelink relay communication link may be configured and activated at the same time, via the same control signaling, or both. For example, in some cases, the first control signal at 345 and the second control signal at 350 may include the same control signal such that a single control signal is used to configure and activate the sidelink relay communication link.

In some aspects, the first control signal (e.g., L3 signaling) at 345, the second control signal (e.g., L1/L2 signaling) at 350, or both, may configure/activate sidelink relay communication links at the relay UE 315-b for multiple target UEs 315-a including the target UE 315-a. For example, in some cases, the L3 signaling at 345 may configure a first sidelink relay communication link between the target UE 315-a and the relay UE 315-a and a second sidelink relay communication link between an additional target UE 315 and the relay UE 315-b. In this example, the L1/L2 signaling at 350 may activate the respective first and second sidelink relay communication links.

At 355, the target UE 315-a, the relay UE 315-b, and the base station 305 may communicate one or more messages via the sidelink relay communication link. For example, the target UE 315-a may transmit a message to the relay UE 315-b via the sidelink relay communication link for relay to the base station 305 via the sidelink relay communication link. By way of another example, the base station 305 may transmit a message to the relay UE 315-b via the sidelink relay communication link for relay to the target UE 315-a via the sidelink relay communication link.

In some aspects, the target UE 315-a, the relay UE 315-b, and the base station 305 may communicate via the sidelink relay communication link at 355 based on communicating (e.g., transmitting or receiving) the message indicating the selected relay UE 315-b at 340, transmitting/receiving the first control signal (e.g., L3 signaling) configuring the sidelink relay communication link at 345, transmitting/receiving the second control signal (e.g., L1/L2 signaling) activating the sidelink relay communication link at 350, or any combination thereof.

In some aspects, as noted previously herein, communications performed at 355 via the sidelink relay communication link may be performed in accordance with (e.g., using) sets of beams that will not experience interference from, or result in interference to, other beams used at the target UE 315-a and/or the relay UE 315-b. For example, the relay UE 315-b may include an existing sidelink relay communication link for relay services for an additional target UE 315, where the existing sidelink relay communication link includes a first set of beams (e.g., first set of Tx/Rx beams at the relay UE 315-b). In this example, communications performed via the sidelink relay communication link at 355 may be performed using a second set of beams (e.g., second set of Tx/Rx beams at the relay UE 315-b), where the second set of beams do not interfere with, or experience interference from, the first set of beams (e.g., the second set of beams are determined/selected based on the first set of beams).

At 360, the base station 305 may transmit a third control signal to the target UE 315-*a*, the relay UE 315-*b*, or both, where the third control signal deactivates the sidelink relay communication link. In some aspects, the third control signal at 360 may be transmitted via L1 signaling, L2 signaling, or both. In some implementations, the base station 305 may transmit the third control signal to the target UE 315-*a* and/or the relay UE 315-*b* via the communication links (e.g., Uu links) between the base station 305 and the respective UEs 315. In additional or alternative implementations, the base station 305 may transmit the third control signal at 360 to the target UE 315-*a* and/or the relay UE 315-*b* via the sidelink relay communication link, another sidelink communication link between the respective UEs 315, or both. For example, the base station 305 may transmit the third control signal to the relay UE 315-*b* via the sidelink relay communication link, and the relay UE 315-*b* may forward (e.g., relay) the control message to the target UE 315-*a* via the sidelink relay communication link.

As noted previously herein with respect to the selection/activation of the sidelink relay communication link, the sidelink relay communication link may also be deactivated at 360 based on joint considerations of sidelink connections and sidelink relay communication link at the respective UEs 315. For example, if the sidelink communication link between the target UE 315-*a* and the relay UE 315-*b* is to be terminated, the relaying service via the sidelink relay communication link may be deactivated, terminated, or otherwise put on hold (e.g., the relay UE 315-*b* is deconfigured/deactivated for that specific target UE 315-*a*). In such cases, the relay UE 315-*b* serving the target UE 315-*a* may be replaced by another relay UE 315 that may have/want to establish a sidelink connection (separate from the relaying service) with the target UE 315-*a*.

Techniques described herein may enable more efficient configuration and activation of sidelink relay communication links, which may enable more widespread use of sidelink relay communication links between UEs 315. In particular, by taking into account existing sidelink relay communication links at the candidate relay UEs 315 and existing sidelink connections at the target UE 315-*a*, techniques described herein may prevent unduly increasing power consumption at selected relay UEs 315, and improve the efficiency of selected sidelink relay communication links. Moreover, by enabling more efficient and widespread use of sidelink relay communication links, techniques described herein may improve link diversity between UEs 315 and base stations 305, thereby facilitating more reliable wireless communications within the wireless communications system. Further, improved use of sidelink relay communication links may reduce power consumption at target UEs 315 (e.g., remote UEs 315).

Figure 4:
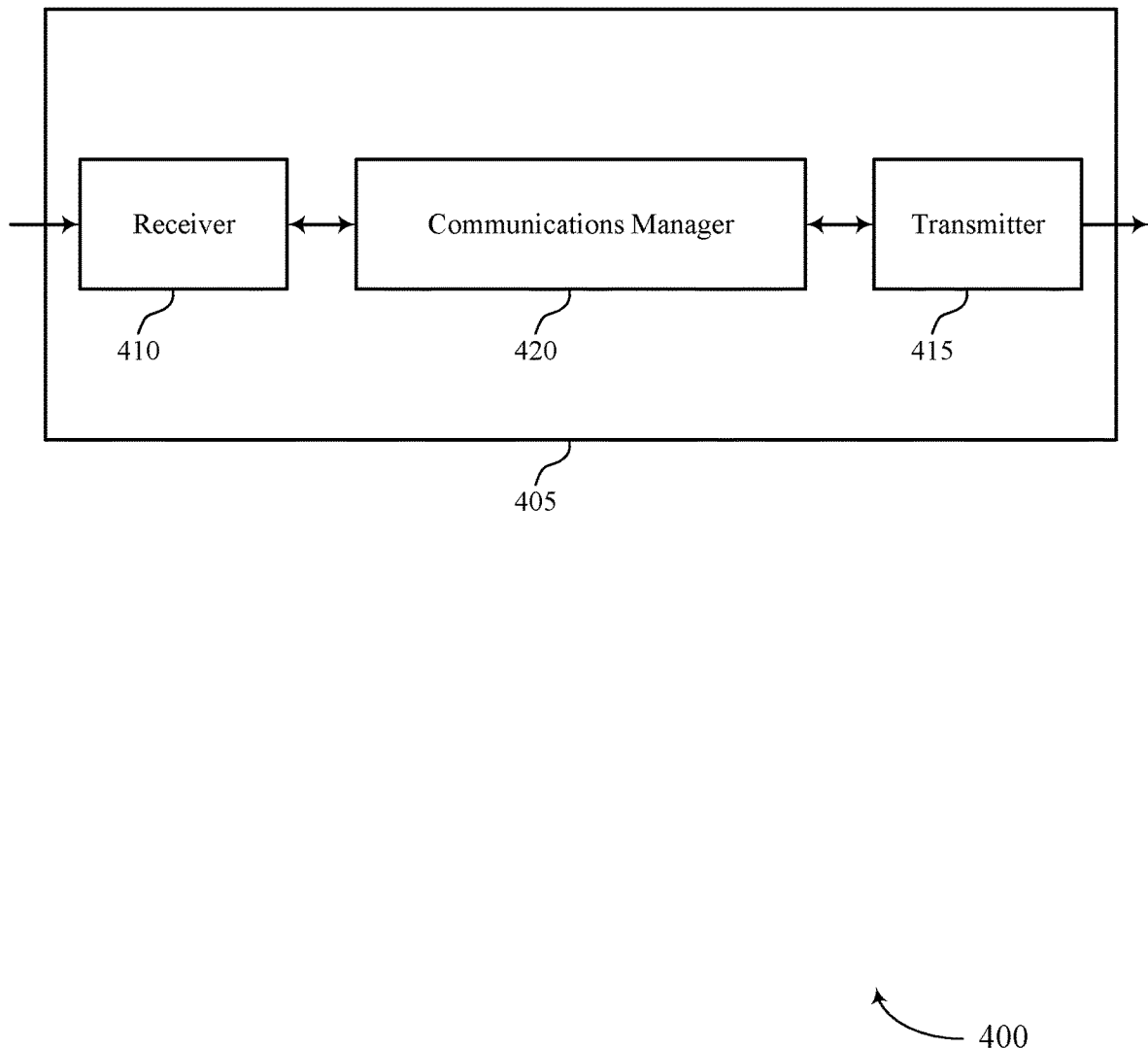
FIGS. 4 and 5 show block diagrams of devices that support techniques for joint UE relay selection and activation in accordance with various aspects of the present disclosure.

FIG. 4 shows a block diagram 400 of a device 405 that supports techniques for joint UE relay selection and activation in accordance with various aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for joint UE relay selection and activation). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for joint UE relay selection and activation). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for joint UE relay selection and activation as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

For example, the communications manager 420 may be configured as or otherwise support a means for communicating a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The communications manager 420 may be configured as or otherwise support a means for receiving, from the base station based on the identification of the relay UE, a first control signal indicating a sidelink relay communication link for communicating messages between the first UE and the base station via the relay UE. The communications manager 420 may be configured as or otherwise support a means for receiving, from the base station, a second control signal that activates the sidelink relay communication link indicated via the first control signal. The communications manager 420 may be configured as or otherwise support a means for communicating, via the sidelink relay communication link, a message to or from the base station via the relay UE.

For example, the communications manager 420 may be configured as or otherwise support a means for communicating a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The communications manager 420 may be configured as or otherwise support a means for receiving, from the base station based on the identification of the relay UE, a first control signal indicating a sidelink relay communication link for communicating messages between the first UE and the base station via the relay UE. The communications manager 420 may be configured as or otherwise support a means for receiving, from the base station, a second control signal that activates the sidelink relay communication link indicated via the first control signal. The communications manager 420 may be configured as or otherwise support a means for communicating a message from the base station to the first UE, from the first UE to the base station, or both.

By including or configuring the communications manager 420 in accordance with examples as described herein, the device 405 (e.g., a processor controlling or otherwise coupled to the receiver 410, the transmitter 415, the communications manager 420, or a combination thereof) may support techniques which enable more efficient configuration and activation of sidelink relay communication links, which may enable more widespread use of sidelink relay communication links between UEs 115. In particular, by taking into account existing sidelink relay communication links at the candidate relay UEs 115 and existing sidelink connections at the target UE 115, techniques described herein may prevent unduly increasing power consumption at selected relay UEs 115, and improve the efficiency of selected sidelink relay communication links. Moreover, by enabling more efficient and widespread use of sidelink relay communication links, techniques described herein may improve link diversity between UEs 115 and base stations 105, thereby facilitating more reliable wireless communications within the wireless communications system 100. Further, improved use of sidelink relay communication links may reduce power consumption at target UEs 115 (e.g., remote UEs 115).

Figure 5:
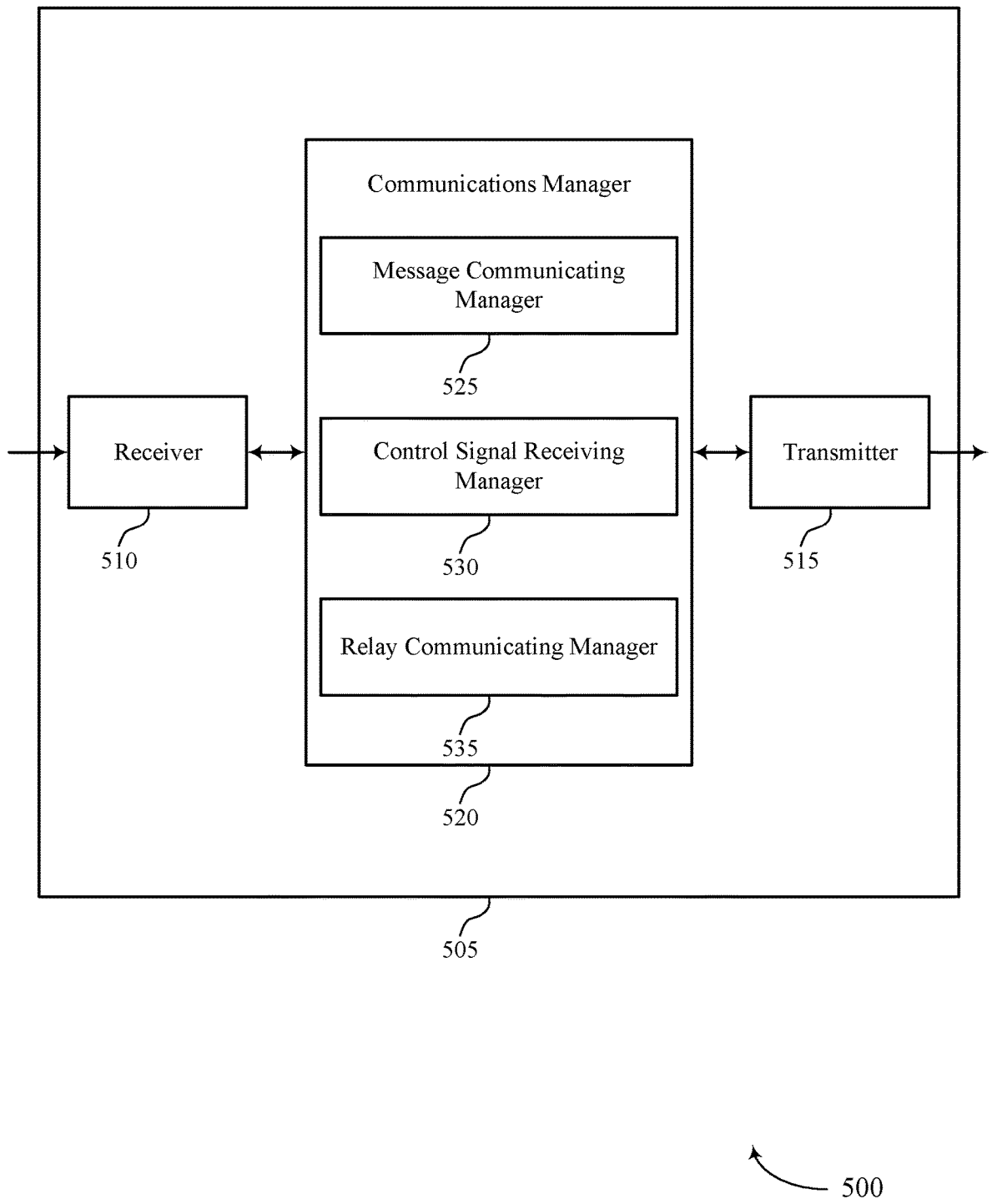

FIG. 5 shows a block diagram 500 of a device 505 that supports techniques for joint UE relay selection and activation in accordance with various aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for joint UE relay selection and activation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for joint UE relay selection and activation). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for joint UE relay selection and activation as described herein. For example, the communications manager 520 may include a message communicating manager 525, a control signal receiving manager 530, a relay communicating manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The message communicating manager 525 may be configured as or otherwise support a means for communicating a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The control signal receiving manager 530 may be configured as or otherwise support a means for receiving, from the base station based on the identification of the relay UE, a first control signal indicating a sidelink relay communication link for communicating messages between the first UE and the base station via the relay UE. The control signal receiving manager 530 may be configured as or otherwise support a means for receiving, from the base station, a second control signal that activates the sidelink relay communication link indicated via the first control signal. The relay communicating manager 535 may be configured as or otherwise support a means for communicating, via the sidelink relay communication link, a message to or from the base station via the relay UE.

The message communicating manager 525 may be configured as or otherwise support a means for communicating a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The control signal receiving manager 530 may be configured as or otherwise support a means for receiving, from the base station based on the identification of the relay UE, a first control signal indicating a sidelink relay communication link for communicating messages between the first UE and the base station via the relay UE. The control signal receiving manager 530 may be configured as or otherwise support a means for receiving, from the base station, a second control signal that activates the sidelink relay communication link indicated via the first control signal. The relay communicating manager 535 may be configured as or otherwise support a means for communicating a message from the base station to the first UE, from the first UE to the base station, or both.

Figure 6:
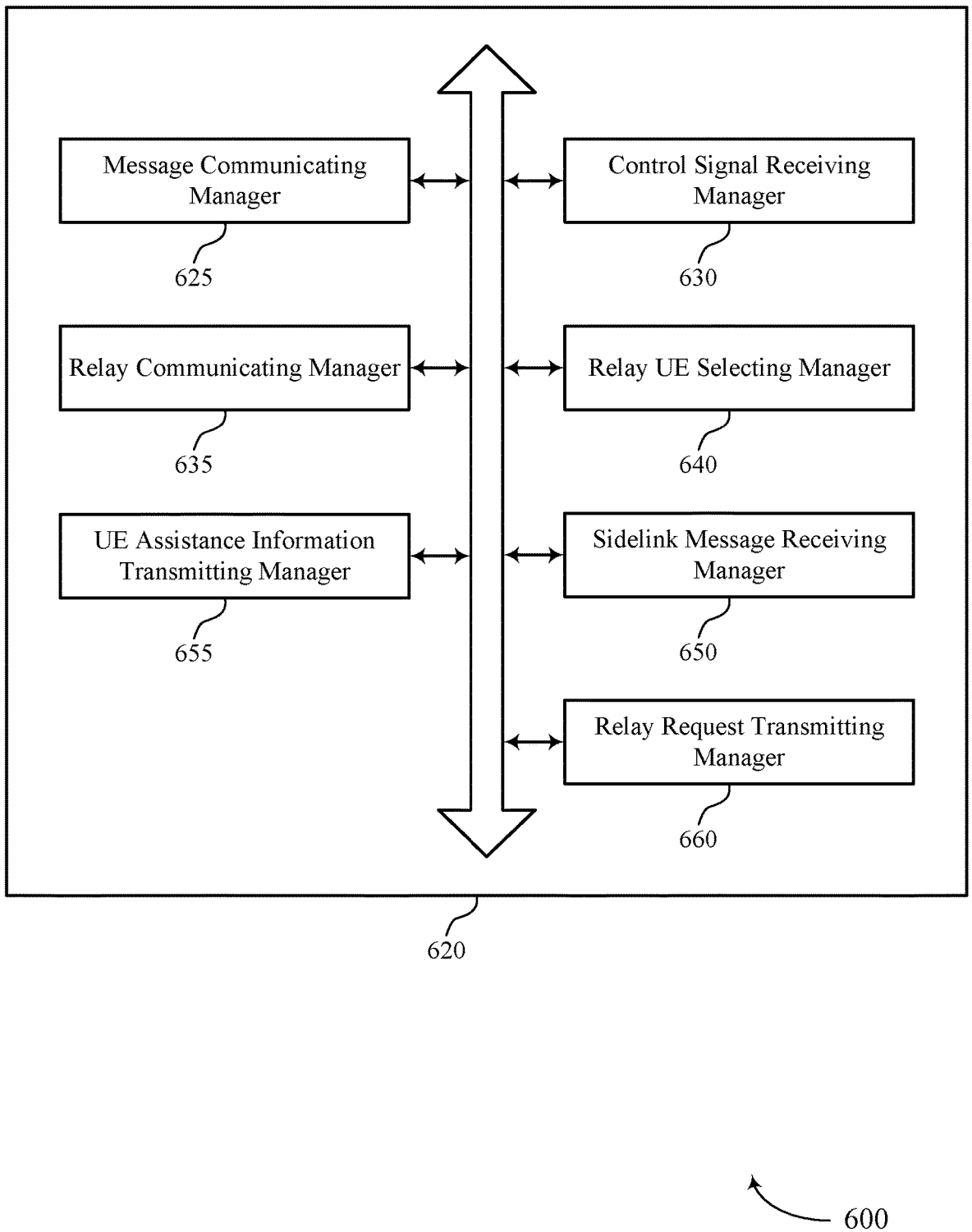
FIG. 6 shows a block diagram of a communications manager that supports techniques for joint UE relay selection and activation in accordance with various aspects of the present disclosure.

FIG. 6 shows a block diagram 600 of a communications manager 620 that supports techniques for joint UE relay selection and activation in accordance with various aspects of the present disclosure. The communications manager 620 may be an example of aspects of a communications manager 420, a communications manager 520, or both, as described herein. The communications manager 620, or various components thereof, may be an example of means for performing various aspects of techniques for joint UE relay selection and activation as described herein. For example, the communications manager 620 may include a message communicating manager 625, a control signal receiving manager 630, a relay communicating manager 635, a relay UE selecting manager 640, a sidelink message receiving manager 650, a UE assistance information transmitting manager 655, a relay request transmitting manager 660, or any combination thereof. Each of these components may communicate, directly or indirectly, with one another (e.g., via one or more buses).

The message communicating manager 625 may be configured as or otherwise support a means for communicating a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The control signal receiving manager 630 may be configured as or otherwise support a means for receiving, from the base station based on the identification of the relay UE, a first control signal indicating a sidelink relay communication link for communicating messages between the first UE and the base station via the relay UE. In some examples, the control signal receiving manager 630 may be configured as or otherwise support a means for receiving, from the base station, a second control signal that activates the sidelink relay communication link indicated via the first control signal. The relay communicating manager 635 may be configured as or otherwise support a means for communicating, via the sidelink relay communication link, a message to or from the base station via the relay UE.

In some examples, the relay UE selecting manager 640 may be configured as or otherwise support a means for selecting the relay UE from the set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, where communicating the message including the identification of the relay UE includes transmitting the message to the base station.

In some examples, the sidelink message receiving manager 650 may be configured as or otherwise support a means for receiving, from the relay UE, a sidelink message including an indication of the one or more existing sidelink relay communication links at the relay UE, the one or more candidate target UEs associated with the relay UE, or both, where selecting the relay UE is based on receiving the sidelink message.

In some examples, to support communicating the message, the message communicating manager 625 may be configured as or otherwise support a means for receiving, from the base station, the relay UE, or both, the message including the identification of the relay UE.

In some examples, the UE assistance information transmitting manager 655 may be configured as or otherwise support a means for transmitting, to the base station, the relay UE, or both, a UE assistance information message including an indication of the one or more existing communication sidelinks between the first UE and the set of multiple candidate relay UEs, where receiving the message including the identification of the relay UE is based on transmitting the UE assistance information message.

In some examples, the relay request transmitting manager 660 may be configured as or otherwise support a means for transmitting, to the base station, a request to establish the sidelink relay communication link with relay UE based on establishing a wireless connection with the relay UE. In some examples, the message communicating manager 625 may be configured as or otherwise support a means for receiving the message including the identification of the relay UE from the base station in response to the request.

In some examples, the relay UE is selected from the set of multiple candidate relay UEs based on a first set of beams used for wireless communications via the one or more existing sidelink relay communication links at the relay UE. In some examples, to support communicating the message to or from the base station via the sidelink relay communication link, the message communicating manager 625 may be configured as or otherwise support a means for communicating the message via a second set of beams, where the second set of beams are determined based on the first set of beams.

In some examples, the relay UE is selected from the set of multiple candidate relay UEs based on a first channel quality associated with a sidelink channel between the first UE and the relay UE, a second channel quality associated with a wireless channel between the relay UE and the base station, or both. In some examples, the relay UE is selected from the set of multiple candidate relay UEs based on an existing communication sidelink between the first UE and the relay UE.

In some examples, the relay UE is selected from the set of multiple candidate relay UEs via a machine learning algorithm based on the one or more existing sidelink relay communication links at the relay UE, the one or more candidate target UEs associated with the relay UE, the one or more existing communication sidelinks between the first UE and the set of multiple candidate relay UEs, or any combination thereof.

In some examples, the relay UE is selected from the set of multiple candidate relay UEs via a machine learning algorithm based on a first set of beams at the first UE, a second set of beams at the relay UE, a multi-panel communication capability associated with the relay UE, a multi-beam communication capability associated with the relay UE, a power state of the first UE, a power state of the second UE, or any combination thereof.

In some examples, the control signal receiving manager 630 may be configured as or otherwise support a means for receiving, from the base station, a third control signal that deactivates the sidelink relay communication link based on the one or more existing sidelink relay communication links at the relay UE, the one or more candidate target UEs associated with the relay UE, the one or more existing communication sidelinks between the first UE and the set of multiple candidate relay UEs, or any combination thereof.

In some examples, where the first control signal indicates a set of multiple sidelink relay communication links for communicating messages between a set of multiple target UEs and the base station via the relay UE, the set of multiple target UEs including the first UE. In some examples, where the second control signal activates the set of multiple sidelink relay communication links between for the set of multiple target UEs.

In some examples, the message including the indication of the relay UE includes the first control signal, the second control signal, or both. In some examples, the first control signal includes an RRC message. In some examples, the second control signal includes a DCI message, a MAC-CE message, or both.

In some examples, the message communicating manager 625 may be configured as or otherwise support a means for communicating a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. In some examples, the control signal receiving manager 630 may be configured as or otherwise support a means for receiving, from the base station based on the identification of the relay UE, a first control signal indicating a sidelink relay communication link for communicating messages between the first UE and the base station via the relay UE. In some examples, the control signal receiving manager 630 may be configured as or otherwise support a means for receiving, from the base station, a second control signal that activates the sidelink relay communication link indicated via the first control signal. In some examples, the relay communicating manager 635 may be configured as or otherwise support a means for communicating a message from the base station to the first UE, from the first UE to the base station, or both.

Figure 7:
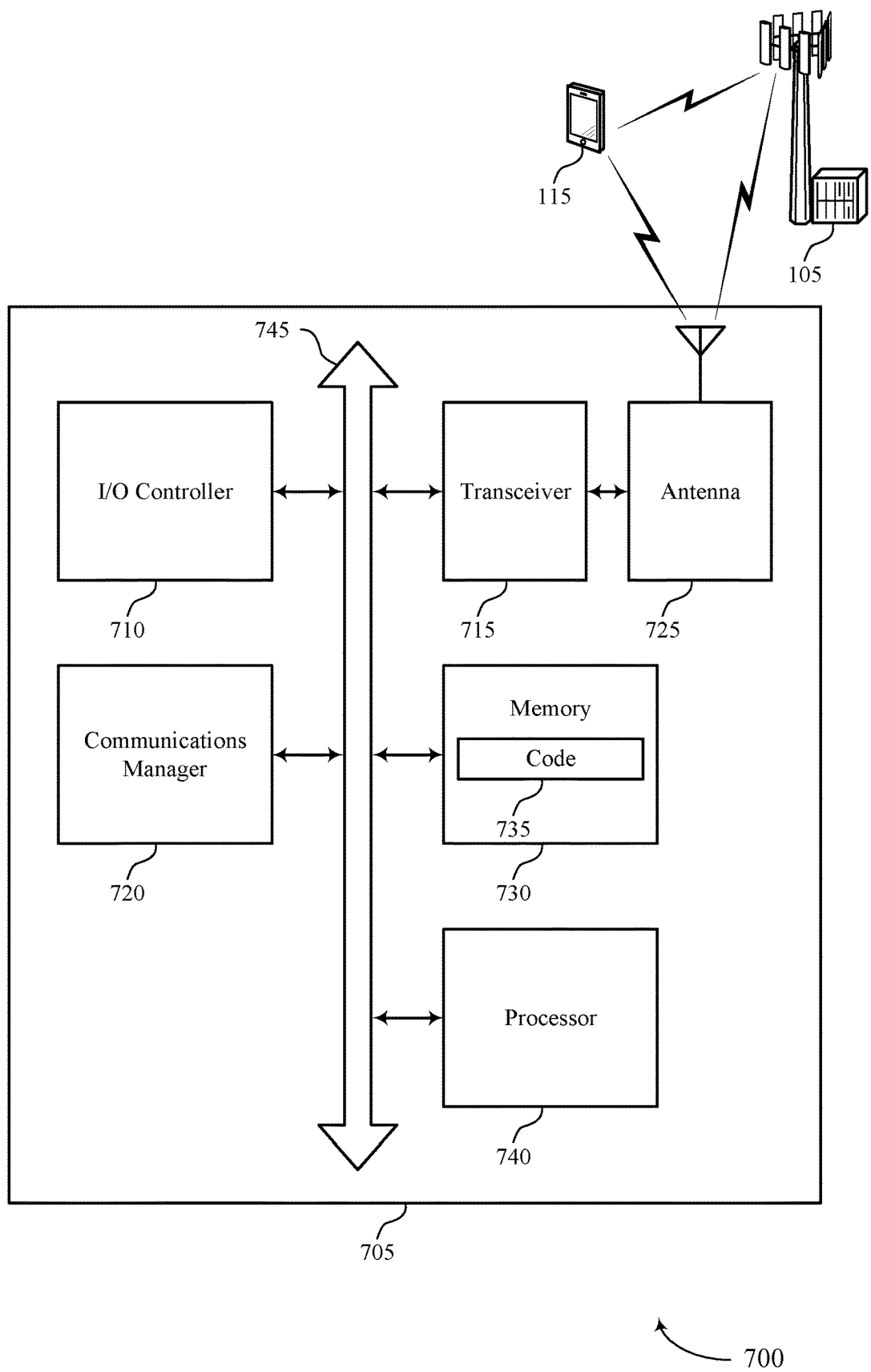
FIG. 7 shows a diagram of a system including a device that supports techniques for joint UE relay selection and activation in accordance with various aspects of the present disclosure.

FIG. 7 shows a diagram of a system 700 including a device 705 that supports techniques for joint UE relay selection and activation in accordance with various aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for joint UE relay selection and activation). For example, the device 705 or a component of the device 705 may include a processor 740 and memory 730 coupled with or to the processor 740, the processor 740 and memory 730 configured to perform various functions described herein.

For example, the communications manager 720 may be configured as or otherwise support a means for communicating a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The communications manager 720 may be configured as or otherwise support a means for receiving, from the base station based on the identification of the relay UE, a first control signal indicating a sidelink relay communication link for communicating messages between the first UE and the base station via the relay UE. The communications manager 720 may be configured as or otherwise support a means for receiving, from the base station, a second control signal that activates the sidelink relay communication link indicated via the first control signal. The communications manager 720 may be configured as or otherwise support a means for communicating, via the sidelink relay communication link, a message to or from the base station via the relay UE.

For example, the communications manager 720 may be configured as or otherwise support a means for communicating a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The communications manager 720 may be configured as or otherwise support a means for receiving, from the base station based on the identification of the relay UE, a first control signal indicating a sidelink relay communication link for communicating messages between the first UE and the base station via the relay UE. The communications manager 720 may be configured as or otherwise support a means for receiving, from the base station, a second control signal that activates the sidelink relay communication link indicated via the first control signal. The communications manager 720 may be configured as or otherwise support a means for communicating a message from the base station to the first UE, from the first UE to the base station, or both.

By including or configuring the communications manager 720 in accordance with examples as described herein, the device 705 may support techniques which enable more efficient configuration and activation of sidelink relay communication links, which may enable more widespread use of sidelink relay communication links between UEs 115. In particular, by taking into account existing sidelink relay communication links at the candidate relay UEs 115 and existing sidelink connections at the target UE 115, techniques described herein may prevent unduly increasing power consumption at selected relay UEs 115, and improve the efficiency of selected sidelink relay communication links. Moreover, by enabling more efficient and widespread use of sidelink relay communication links, techniques described herein may improve link diversity between UEs 115 and base stations 105, thereby facilitating more reliable wireless communications within the wireless communications system 100. Further, improved use of sidelink relay communication links may reduce power consumption at target UEs 115 (e.g., remote UEs 115).

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for joint UE relay selection and activation as described herein, or the processor 740 and the memory 730 may be otherwise configured to perform or support such operations.

Figure 8:
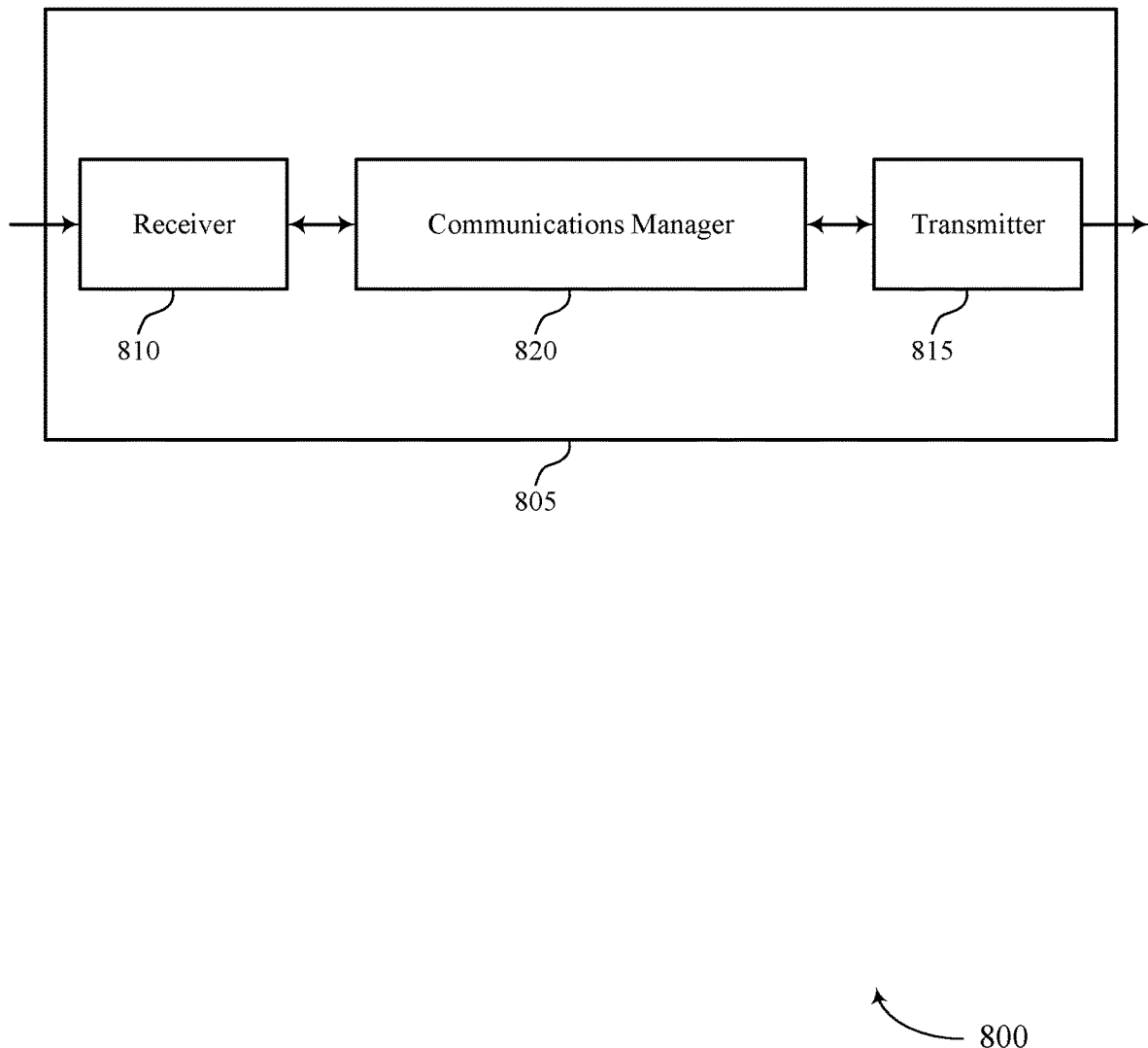
FIGS. 8 and 9 show block diagrams of devices that support techniques for joint UE relay selection and activation in accordance with various aspects of the present disclosure.

FIG. 8 shows a block diagram 800 of a device 805 that supports techniques for joint UE relay selection and activation in accordance with various aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for joint UE relay selection and activation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for joint UE relay selection and activation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for joint UE relay selection and activation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

For example, the communications manager 820 may be configured as or otherwise support a means for communicating a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The communications manager 820 may be configured as or otherwise support a means for transmitting, to the first UE, the relay UE, or both, and based on the identification of the relay UE, a first control signal indicating a sidelink relay communication link for communicating messages between the first UE and the base station via the relay UE. The communications manager 820 may be configured as or otherwise support a means for transmitting, to the first UE, the relay UE, or both, a second control signal that activates the sidelink relay communication link indicated via the first control signal. The communications manager 820 may be configured as or otherwise support a means for communicating, via the sidelink relay communication link, a message to or from the first UE via the relay UE.

By including or configuring the communications manager 820 in accordance with examples as described herein, the device 805 (e.g., a processor controlling or otherwise coupled to the receiver 810, the transmitter 815, the communications manager 820, or a combination thereof) may support techniques which enable more efficient configuration and activation of sidelink relay communication links, which may enable more widespread use of sidelink relay communication links between UEs 115. In particular, by taking into account existing sidelink relay communication links at the candidate relay UEs 115 and existing sidelink connections at the target UE 115, techniques described herein may prevent unduly increasing power consumption at selected relay UEs 115, and improve the efficiency of selected sidelink relay communication links. Moreover, by enabling more efficient and widespread use of sidelink relay communication links, techniques described herein may improve link diversity between UEs 115 and base stations 105, thereby facilitating more reliable wireless communications within the wireless communications system 100. Further, improved use of sidelink relay communication links may reduce power consumption at target UEs 115 (e.g., remote UEs 115).

Figure 9:
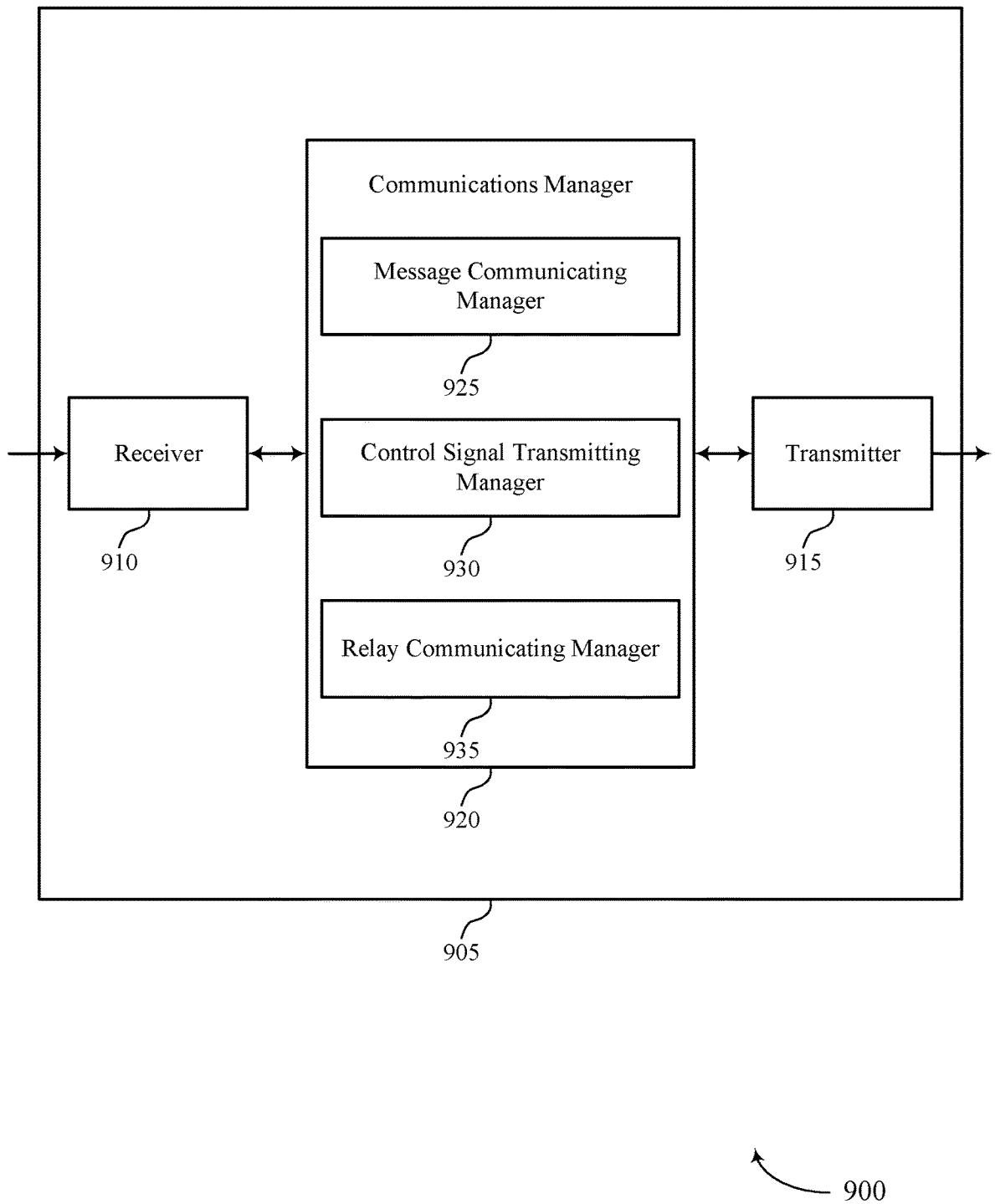

FIG. 9 shows a block diagram 900 of a device 905 that supports techniques for joint UE relay selection and activation in accordance with various aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for joint UE relay selection and activation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for joint UE relay selection and activation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for joint UE relay selection and activation as described herein. For example, the communications manager 920 may include a message communicating manager 925, a control signal transmitting manager 930, a relay communicating manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The message communicating manager 925 may be configured as or otherwise support a means for communicating a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The control signal transmitting manager 930 may be configured as or otherwise support a means for transmitting, to the first UE, the relay UE, or both, and based on the identification of the relay UE, a first control signal indicating a sidelink relay communication link for communicating messages between the first UE and the base station via the relay UE. The control signal transmitting manager 930 may be configured as or otherwise support a means for transmitting, to the first UE, the relay UE, or both, a second control signal that activates the sidelink relay communication link indicated via the first control signal. The relay communicating manager 935 may be configured as or otherwise support a means for communicating, via the sidelink relay communication link, a message to or from the first UE via the relay UE.

Figure 10:
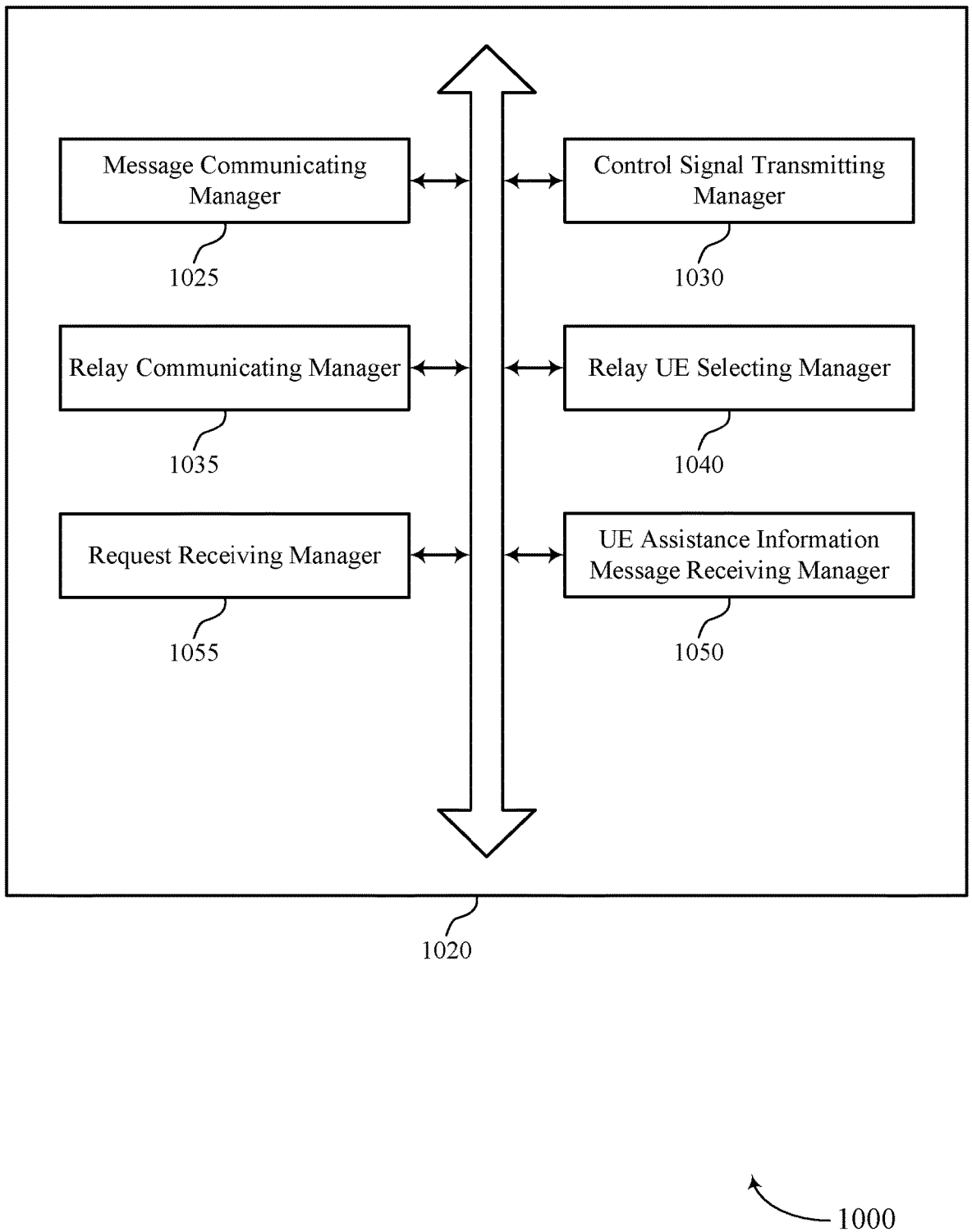
FIG. 10 shows a block diagram of a communications manager that supports techniques for joint UE relay selection and activation in accordance with various aspects of the present disclosure.

FIG. 10 shows a block diagram 1000 of a communications manager 1020 that supports techniques for joint UE relay selection and activation in accordance with various aspects of the present disclosure. The communications manager 1020 may be an example of aspects of a communications manager 820, a communications manager 920, or both, as described herein. The communications manager 1020, or various components thereof, may be an example of means for performing various aspects of techniques for joint UE relay selection and activation as described herein. For example, the communications manager 1020 may include a message communicating manager 1025, a control signal transmitting manager 1030, a relay communicating manager 1035, a relay UE selecting manager 1040, a UE assistance information message receiving manager 1050, a request receiving manager 1055, or any combination thereof. Each of these components may communicate, directly or indirectly, with one another (e.g., via one or more buses).

The message communicating manager 1025 may be configured as or otherwise support a means for communicating a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The control signal transmitting manager 1030 may be configured as or otherwise support a means for transmitting, to the first UE, the relay UE, or both, and based on the identification of the relay UE, a first control signal indicating a sidelink relay communication link for communicating messages between the first UE and the base station via the relay UE. In some examples, the control signal transmitting manager 1030 may be configured as or otherwise support a means for transmitting, to the first UE, the relay UE, or both, a second control signal that activates the sidelink relay communication link indicated via the first control signal. The relay communicating manager 1035 may be configured as or otherwise support a means for communicating, via the sidelink relay communication link, a message to or from the first UE via the relay UE.

In some examples, the relay UE selecting manager 1040 may be configured as or otherwise support a means for selecting the relay UE from the set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof, where communicating the message including the identification of the relay UE includes transmitting the message to the base station.

In some examples, the UE assistance information message receiving manager 1050 may be configured as or otherwise support a means for receiving, from the relay UE, an uplink message including an indication of the one or more existing sidelink relay communication links at the relay UE, the one or more candidate target UEs associated with the relay UE, or both, where selecting the relay UE is based on receiving the sidelink message.

In some examples, to support communicating the message, the message communicating manager 1025 may be configured as or otherwise support a means for transmitting, to the first UE, the relay UE, or both, the message including the identification of the relay UE.

In some examples, the UE assistance information message receiving manager 1050 may be configured as or otherwise support a means for receiving, from the first UE, the relay UE, or both, a UE assistance information message including an indication of the one or more existing communication sidelinks between the first UE and the set of multiple candidate relay UEs, where transmitting the message including the identification of the relay UE is based on receiving the UE assistance information message.

In some examples, the request receiving manager 1055 may be configured as or otherwise support a means for receiving, from the first UE, a request to establish the sidelink relay communication link with relay UE. In some examples, the message communicating manager 1025 may be configured as or otherwise support a means for transmitting, in response to the request, the message including the identification of the relay UE to the first UE, the relay UE, or both.

In some examples, the relay UE is selected from the set of multiple candidate relay UEs based on a first set of beams at the relay UE used for wireless communications via the one or more existing sidelink relay communication links at the relay UE. In some examples, to support communicating the message to or from the first UE via the sidelink relay communication link, the message communicating manager 1025 may be configured as or otherwise support a means for communicating the message via a second set of beams, where the second set of beams are determined based on the first set of beams.

In some examples, the relay UE is selected from the set of multiple candidate relay UEs based on a first channel quality associated with a sidelink channel between the first UE and the relay UE, a second channel quality associated with a wireless channel between the relay UE and the base station, or both. In some examples, the relay UE is selected from the set of multiple candidate relay UEs based on an existing communication sidelink between the first UE and the relay UE.

In some examples, the control signal transmitting manager 1030 may be configured as or otherwise support a means for transmitting, to the first UE, the relay UE, or both, a third control signal that deactivates the sidelink relay communication link based on the one or more existing sidelink relay communication links at the relay UE, the one or more candidate target UEs associated with the relay UE, the one or more existing communication sidelinks between the first UE and the set of multiple candidate relay UEs, or any combination thereof.

In some examples, where the first control signal indicates a set of multiple sidelink relay communication links for communicating messages between a set of multiple target UEs and the base station via the relay UE, the set of multiple target UEs including the first UE. In some examples, where the second control signal activates the set of multiple sidelink relay communication links between for the set of multiple target UEs. In some examples, the first control signal includes an RRC message. In some examples, the second control signal includes a DCI message, a MAC-CE message, or both.

Figure 11:
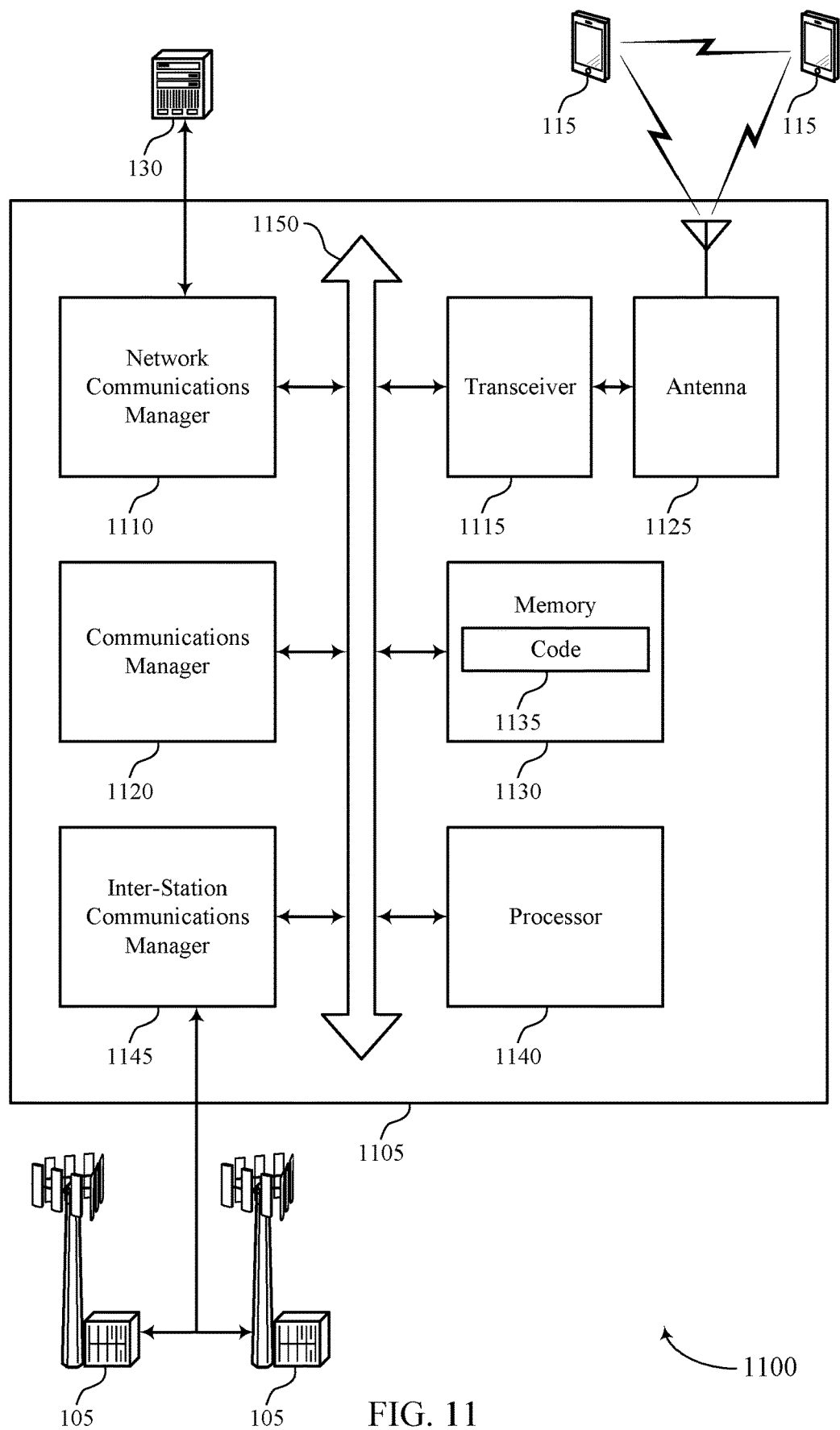
FIG. 11 shows a diagram of a system including a device that supports techniques for joint UE relay selection and activation in accordance with various aspects of the present disclosure.

FIG. 11 shows a diagram of a system 1100 including a device 1105 that supports techniques for joint UE relay selection and activation in accordance with various aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for joint UE relay selection and activation). For example, the device 1105 or a component of the device 1105 may include a processor 1140 and memory 1130 coupled with or to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

For example, the communications manager 1120 may be configured as or otherwise support a means for communicating a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The communications manager 1120 may be configured as or otherwise support a means for transmitting, to the first UE, the relay UE, or both, and based on the identification of the relay UE, a first control signal indicating a sidelink relay communication link for communicating messages between the first UE and the base station via the relay UE. The communications manager 1120 may be configured as or otherwise support a means for transmitting, to the first UE, the relay UE, or both, a second control signal that activates the sidelink relay communication link indicated via the first control signal. The communications manager 1120 may be configured as or otherwise support a means for communicating, via the sidelink relay communication link, a message to or from the first UE via the relay UE.

By including or configuring the communications manager 1120 in accordance with examples as described herein, the device 1105 may support techniques which enable more efficient configuration and activation of sidelink relay communication links, which may enable more widespread use of sidelink relay communication links between UEs 115. In particular, by taking into account existing sidelink relay communication links at the candidate relay UEs 115 and existing sidelink connections at the target UE 115, techniques described herein may prevent unduly increasing power consumption at selected relay UEs 115, and improve the efficiency of selected sidelink relay communication links. Moreover, by enabling more efficient and widespread use of sidelink relay communication links, techniques described herein may improve link diversity between UEs 115 and base stations 105, thereby facilitating more reliable wireless communications within the wireless communications system 100. Further, improved use of sidelink relay communication links may reduce power consumption at target UEs 115 (e.g., remote UEs 115).

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for joint UE relay selection and activation as described herein, or the processor 1140 and the memory 1130 may be otherwise configured to perform or support such operations.

Figure 12:
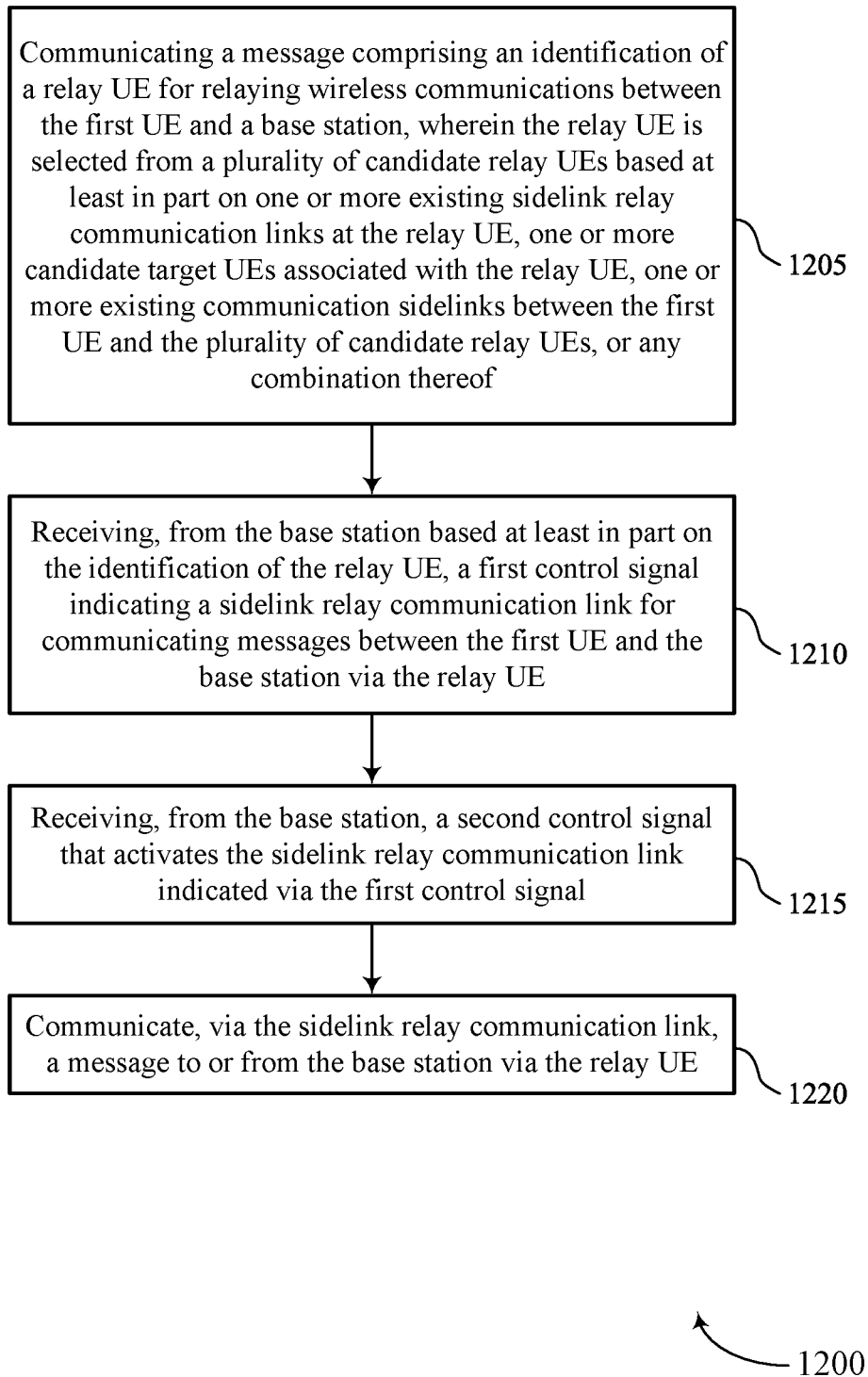
FIGS. 12 through 14 show flowcharts illustrating methods that support techniques for joint UE relay selection and activation in accordance with various aspects of the present disclosure.

FIG. 12 shows a flowchart illustrating a method 1200 that supports techniques for joint UE relay selection and activation in accordance with various aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include communicating a message including an identification of a relay UE for relaying wireless communications between the first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The operations of 1205 may be performed in accordance with examples as disclosed herein. In some examples, aspects of the operations of 1205 may be performed by a message communicating manager 625 as described with reference to FIG. 6.

At 1210, the method may include receiving, from the base station based on the identification of the relay UE, a first control signal indicating a sidelink relay communication link for communicating messages between the first UE and the base station via the relay UE. The operations of 1210 may be performed in accordance with examples as disclosed herein. In some examples, aspects of the operations of 1210 may be performed by a control signal receiving manager 630 as described with reference to FIG. 6.

At 1215, the method may include receiving, from the base station, a second control signal that activates the sidelink relay communication link indicated via the first control signal. The operations of 1215 may be performed in accordance with examples as disclosed herein. In some examples, aspects of the operations of 1215 may be performed by a control signal receiving manager 630 as described with reference to FIG. 6.

At 1220, the method may include communicating, via the sidelink relay communication link, a message to or from the base station via the relay UE. The operations of 1220 may be performed in accordance with examples as disclosed herein. In some examples, aspects of the operations of 1220 may be performed by a relay communicating manager 635 as described with reference to FIG. 6.

Figure 13:
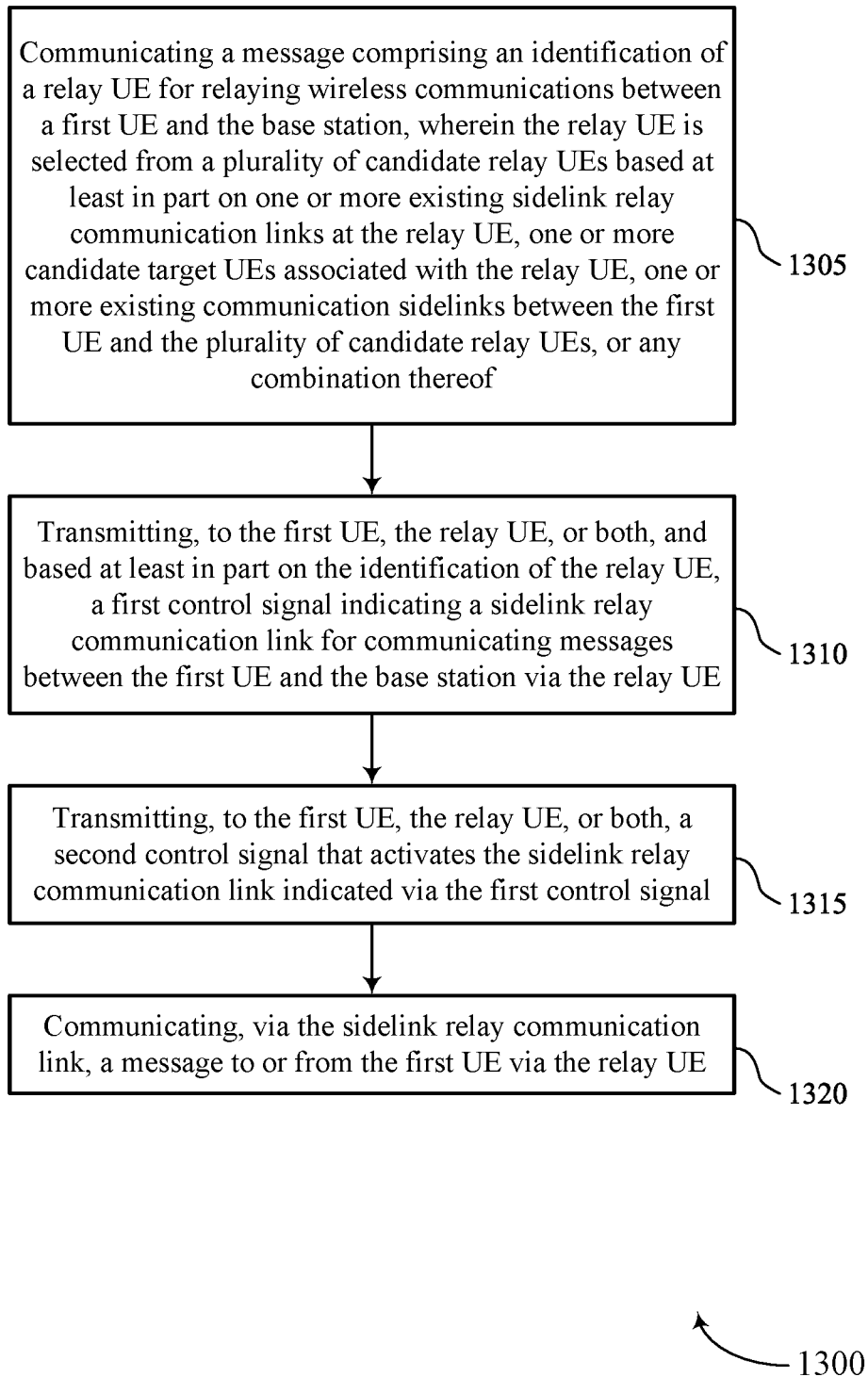

FIG. 13 shows a flowchart illustrating a method 1300 that supports techniques for joint UE relay selection and activation in accordance with various aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1305, the method may include communicating a message including an identification of a relay UE for relaying wireless communications between a first UE and the base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The operations of 1305 may be performed in accordance with examples as disclosed herein. In some examples, aspects of the operations of 1305 may be performed by a message communicating manager 1025 as described with reference to FIG. 10.

At 1310, the method may include transmitting, to the first UE, the relay UE, or both, and based on the identification of the relay UE, a first control signal indicating a sidelink relay communication link for communicating messages between the first UE and the base station via the relay UE. The operations of 1310 may be performed in accordance with examples as disclosed herein. In some examples, aspects of the operations of 1310 may be performed by a control signal transmitting manager 1030 as described with reference to FIG. 10.

At 1315, the method may include transmitting, to the first UE, the relay UE, or both, a second control signal that activates the sidelink relay communication link indicated via the first control signal. The operations of 1315 may be performed in accordance with examples as disclosed herein. In some examples, aspects of the operations of 1315 may be performed by a control signal transmitting manager 1030 as described with reference to FIG. 10.

At 1320, the method may include communicating, via the sidelink relay communication link, a message to or from the first UE via the relay UE. The operations of 1320 may be performed in accordance with examples as disclosed herein. In some examples, aspects of the operations of 1320 may be performed by a relay communicating manager 1035 as described with reference to FIG. 10.

Figure 14:
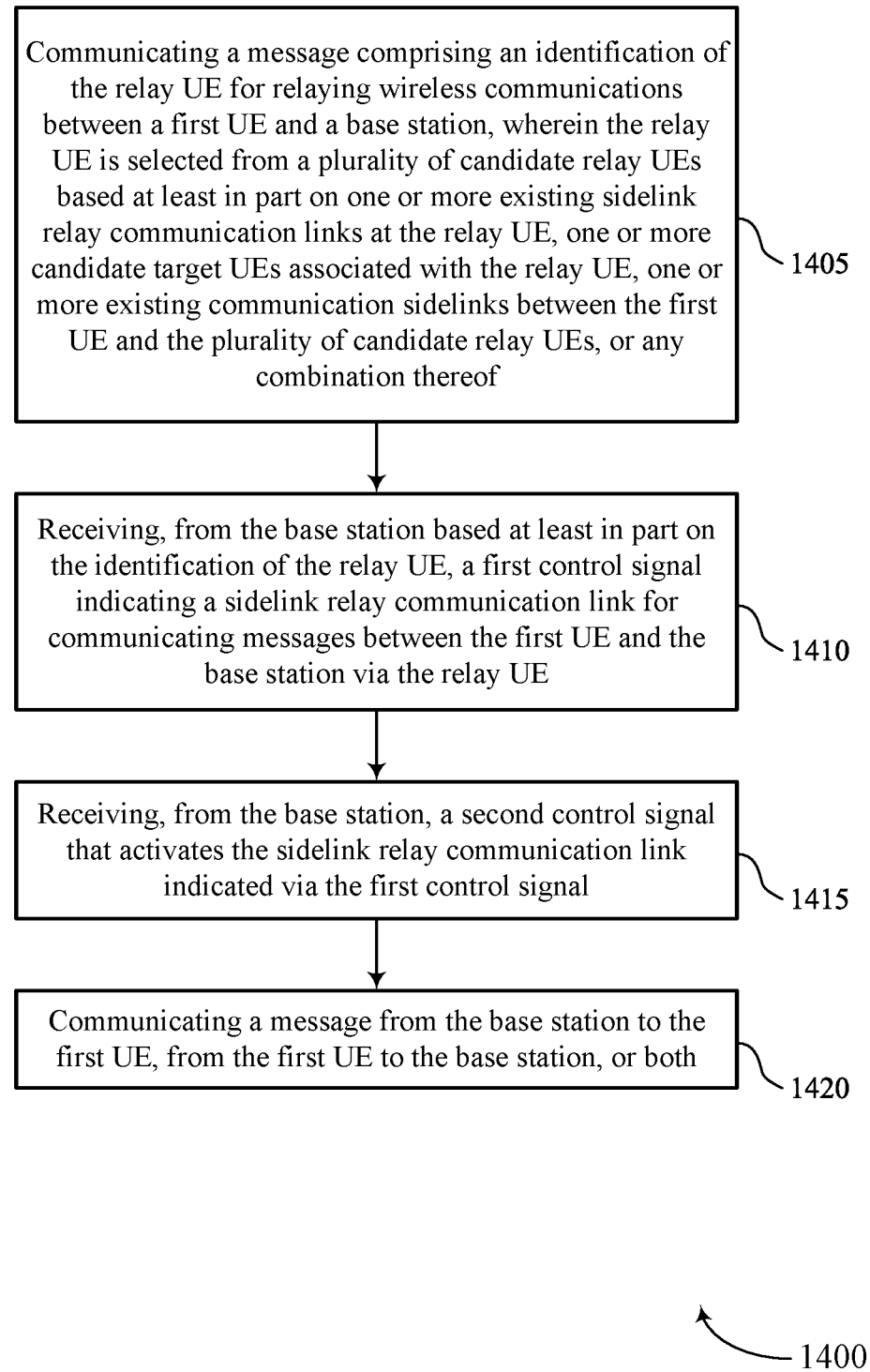

FIG. 14 shows a flowchart illustrating a method 1400 that supports techniques for joint UE relay selection and activation in accordance with various aspects of the present disclosure. The operations of the method 1400 may be implemented by a UE or its components as described herein.

For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include communicating a message including an identification of the relay UE for relaying wireless communications between a first UE and a base station, where the relay UE is selected from a set of multiple candidate relay UEs based on one or more existing sidelink relay communication links at the relay UE, one or more candidate target UEs associated with the relay UE, one or more existing communication sidelinks between the first UE and the set of multiple candidate relay UEs, or any combination thereof. The operations of 1405 may be performed in accordance with examples as disclosed herein. In some examples, aspects of the operations of 1405 may be performed by a message communicating manager 625 as described with reference to FIG. 6.

At 1410, the method may include receiving, from the base station based on the identification of the relay UE, a first control signal indicating a sidelink relay communication link for communicating messages between the first UE and the base station via the relay UE. The operations of 1410 may be performed in accordance with examples as disclosed herein. In some examples, aspects of the operations of 1410 may be performed by a control signal receiving manager 630 as described with reference to FIG. 6.

At 1415, the method may include receiving, from the base station, a second control signal that activates the sidelink relay communication link indicated via the first control signal. The operations of 1415 may be performed in accordance with examples as disclosed herein. In some examples, aspects of the operations of 1415 may be performed by a control signal receiving manager 630 as described with reference to FIG. 6.

At 1420, the method may include communicating a message from the base station to the first UE, from the first UE to the base station, or both. The operations of 1420 may be performed in accordance with examples as disclosed herein. In some examples, aspects of the operations of 1420 may be performed by a relay communicating manager 635 as described with reference to FIG. 6.

The following provides an overview of aspects of the present disclosure:

Aspect 1: A method for wireless communication at a first UE, comprising: communicating a message comprising an identification of a relay UE for relaying wireless communications between the first UE and a base station, wherein the relay UE is selected from a plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof; receiving, from the base station based at least in part on the identification of the relay UE, a first control signal indicating a sidelink relay communication link for communicating messages between the first UE and the base station via the relay UE; receiving, from the base station, a second control signal that activates the sidelink relay communication link indicated via the first control signal; and communicating, via the sidelink relay communication link, a message to or from the base station via the relay UE.

Aspect 2: The method of aspect 1, further comprising: selecting the relay UE from the plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof, wherein communicating the message including the identification of the relay UE comprises transmitting the message to the base station.

Aspect 3: The method of aspect 2, further comprising: receiving, from the relay UE, a sidelink message comprising an indication of the one or more existing sidelink relay communication links at the relay UE, the one or more candidate target UEs associated with the relay UE, or both, wherein selecting the relay UE is based at least in part on receiving the sidelink message.

Aspect 4: The method of any of aspects 1 through 3, wherein communicating the message comprises: receiving, from the base station, the relay UE, or both, the message including the identification of the relay UE.

Aspect 5: The method of aspect 4, further comprising: transmitting, to the base station, the relay UE, or both, a UE assistance information message comprising an indication of the one or more existing communication sidelinks between the first UE and the plurality of candidate relay UEs, wherein receiving the message including the identification of the relay UE is based at least in part on transmitting the UE assistance information message.

Aspect 6: The method of any of aspects 4 through 5, further comprising: transmitting, to the base station, a request to establish the sidelink relay communication link with relay UE based at least in part on establishing a wireless connection with the relay UE; and receiving the message including the identification of the relay UE from the base station in response to the request.

Aspect 7: The method of any of aspects 1 through 6, wherein the relay UE is selected from the plurality of candidate relay UEs based at least in part on a first set of beams used for wireless communications via the one or more existing sidelink relay communication links at the relay UE.

Aspect 8: The method of aspect 7, wherein communicating the message to or from the base station via the sidelink relay communication link comprises: communicating the message via a second set of beams, wherein the second set of beams are determined based at least in part on the first set of beams.

Aspect 9: The method of any of aspects 1 through 8, wherein the relay UE is selected from the plurality of candidate relay UEs based at least in part on a first channel quality associated with a sidelink channel between the first UE and the relay UE, a second channel quality associated with a wireless channel between the relay UE and the base station, or both.

Aspect 10: The method of any of aspects 1 through 9, wherein the relay UE is selected from the plurality of candidate relay UEs based at least in part on an existing communication sidelink between the first UE and the relay UE.

Aspect 11: The method of any of aspects 1 through 10, wherein the relay UE is selected from the plurality of candidate relay UEs via a machine learning algorithm based at least in part on the one or more existing sidelink relay communication links at the relay UE, the one or more candidate target UEs associated with the relay UE, the one or more existing communication sidelinks between the first UE and the plurality of candidate relay UEs, or any combination thereof.

Aspect 12: The method of any of aspects 1 through 11, wherein the relay UE is selected from the plurality of candidate relay UEs via a machine learning algorithm based at least in part on a first set of beams at the first UE, a second set of beams at the relay UE, a multi-panel communication capability associated with the relay UE, a multi-beam communication capability associated with the relay UE, a power state of the first UE, a power state of the second UE, or any combination thereof.

Aspect 13: The method of any of aspects 1 through 12, further comprising: receiving, from the base station, a third control signal that deactivates the sidelink relay communication link based at least in part on the one or more existing sidelink relay communication links at the relay UE, the one or more candidate target UEs associated with the relay UE, the one or more existing communication sidelinks between the first UE and the plurality of candidate relay UEs, or any combination thereof.

Aspect 14: The method of any of aspects 1 through 13, wherein the first control signal indicates a plurality of sidelink relay communication links for communicating messages between a plurality of target UEs and the base station via the relay UE, the plurality of target UEs including the first UE, or wherein the second control signal activates the plurality of sidelink relay communication links between for the plurality of target UEs Aspect 15: The method of any of aspects 1 through 14, wherein the message including the indication of the relay UE comprises the first control signal, the second control signal, or both.

Aspect 16: The method of any of aspects 1 through 15, wherein the first control signal comprises an RRC message, and the second control signal comprises a DCI message, a MAC-CE message, or both.

Aspect 17: A method for wireless communication at a base station, comprising: communicating a message comprising an identification of a relay UE for relaying wireless communications between a first UE and the base station, wherein the relay UE is selected from a plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof; transmitting, to the first UE, the relay UE, or both, and based at least in part on the identification of the relay UE, a first control signal indicating a sidelink relay communication link for communicating messages between the first UE and the base station via the relay UE; transmitting, to the first UE, the relay UE, or both, a second control signal that activates the sidelink relay communication link indicated via the first control signal; and communicating, via the sidelink relay communication link, a message to or from the first UE via the relay UE.

Aspect 18: The method of aspect 17, further comprising: selecting the relay UE from the plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof, wherein communicating the message including the identification of the relay UE comprises transmitting the message to the base station.

Aspect 19: The method of aspect 18, further comprising: receiving, from the relay UE, an uplink message comprising an indication of the one or more existing sidelink relay communication links at the relay UE, the one or more candidate target UEs associated with the relay UE, or both, wherein selecting the relay UE is based at least in part on receiving the sidelink message.

Aspect 20: The method of any of aspects 17 through 19, wherein communicating the message comprises: transmitting, to the first UE, the relay UE, or both, the message including the identification of the relay UE.

Aspect 21: The method of aspect 20, further comprising: receiving, from the first UE, the relay UE, or both, a UE assistance information message comprising an indication of the one or more existing communication sidelinks between the first UE and the plurality of candidate relay UEs, wherein transmitting the message including the identification of the relay UE is based at least in part on receiving the UE assistance information message.

Aspect 22: The method of any of aspects 20 through 21, further comprising: receiving, from the first UE, a request to establish the sidelink relay communication link with relay UE; and transmitting, in response to the request, the message including the identification of the relay UE to the first UE, the relay UE, or both.

Aspect 23: The method of any of aspects 17 through 22, wherein the relay UE is selected from the plurality of candidate relay UEs based at least in part on a first set of beams at the relay UE used for wireless communications via the one or more existing sidelink relay communication links at the relay UE.

Aspect 24: The method of aspect 23, wherein communicating the message to or from the first UE via the sidelink relay communication link comprises: communicating the message via a second set of beams, wherein the second set of beams are determined based at least in part on the first set of beams.

Aspect 25: The method of any of aspects 17 through 24, wherein the relay UE is selected from the plurality of candidate relay UEs based at least in part on a first channel quality associated with a sidelink channel between the first UE and the relay UE, a second channel quality associated with a wireless channel between the relay UE and the base station, or both.

Aspect 26: The method of any of aspects 17 through 25, wherein the relay UE is selected from the plurality of candidate relay UEs based at least in part on an existing communication sidelink between the first UE and the relay UE.

Aspect 27: The method of any of aspects 17 through 26, further comprising: transmitting, to the first UE, the relay UE, or both, a third control signal that deactivates the sidelink relay communication link based at least in part on the one or more existing sidelink relay communication links at the relay UE, the one or more candidate target UEs associated with the relay UE, the one or more existing communication sidelinks between the first UE and the plurality of candidate relay UEs, or any combination thereof.

Aspect 28: The method of any of aspects 17 through 27, wherein the first control signal indicates a plurality of sidelink relay communication links for communicating messages between a plurality of target UEs and the base station via the relay UE, the plurality of target UEs including the first UE, or wherein the second control signal activates the plurality of sidelink relay communication links between for the plurality of target UEs Aspect 29: The method of any of aspects 17 through 28, wherein the first control signal comprises an RRC message, and the second control signal comprises a DCI message, a MAC-CE message, or both.

Aspect 30: A method for wireless communication at a relay UE, comprising: communicating a message comprising an identification of the relay UE for relaying wireless communications between a first UE and a base station, wherein the relay UE is selected from a plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof; receiving, from the base station based at least in part on the identification of the relay UE, a first control signal indicating a sidelink relay communication link for communicating messages between the first UE and the base station via the relay UE; receiving, from the base station, a second control signal that activates the sidelink relay communication link indicated via the first control signal; and communicating a message from the base station to the first UE, from the first UE to the base station, or both.

Aspect 31: An apparatus comprising a processor; memory coupled with the processor; and instructions stored in the memory and executable by the processor to cause the apparatus to perform a method of any of aspects 1 through 16.

Aspect 32: An apparatus comprising at least one means for performing a method of any of aspects 1 through 16.

Aspect 33: A non-transitory computer-readable medium storing code the code comprising instructions executable by a processor to perform a method of any of aspects 1 through 16.

Aspect 34: An apparatus comprising a processor; memory coupled with the processor; and instructions stored in the memory and executable by the processor to cause the apparatus to perform a method of any of aspects 17 through 29.

Aspect 35: An apparatus comprising at least one means for performing a method of any of aspects 17 through 29.

Aspect 36: A non-transitory computer-readable medium storing code the code comprising instructions executable by a processor to perform a method of any of aspects 17 through 29.

Aspect 37: An apparatus comprising a processor; memory coupled with the processor; and instructions stored in the memory and executable by the processor to cause the apparatus to perform a method of any of aspects 30 through 30.

Aspect 38: An apparatus comprising at least one means for performing a method of any of aspects 30 through 30.

Aspect 39: A non-transitory computer-readable medium storing code the code comprising instructions executable by a processor to perform a method of any of aspects 30 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   communicating a message comprising an identification of a relay UE for relaying wireless communications between the first UE and a base station, wherein the relay UE is selected from a plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof;
   receiving, from the base station based at least in part on the identification of the relay UE, a first control signal indicating a sidelink relay communication link for communicating messages between the first UE and the base station via the relay UE;
   receiving, from the base station, a second control signal that activates the sidelink relay communication link indicated via the first control signal; and
   communicating, via the sidelink relay communication link, a message to or from the base station via the relay UE.

2. The method of claim 1, further comprising:
   selecting the relay UE from the plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof, wherein communicating the message including the identification of the relay UE comprises transmitting the message to the base station.

3. The method of claim 2, further comprising:
   receiving, from the relay UE, a sidelink message comprising an indication of the one or more existing sidelink relay communication links at the relay UE, the one or more candidate target UEs associated with the relay UE, or both, wherein selecting the relay UE is based at least in part on receiving the sidelink message.

4. The method of claim 1, wherein communicating the message comprises:
   receiving, from the base station, the relay UE, or both, the message including the identification of the relay UE.

5. The method of claim 4, further comprising:
   transmitting, to the base station, the relay UE, or both, a UE assistance information message comprising an indication of the one or more existing communication sidelinks between the first UE and the plurality of candidate relay UEs, wherein receiving the message including the identification of the relay UE is based at least in part on transmitting the UE assistance information message.

6. The method of claim 4, further comprising:
   transmitting, to the base station, a request to establish the sidelink relay communication link with the relay UE based at least in part on establishing a wireless connection with the relay UE; and
   receiving the message including the identification of the relay UE from the base station in response to the request.

7. The method of claim 1, wherein the relay UE is selected from the plurality of candidate relay UEs based at least in part on a first set of beams used for wireless communications via the one or more existing sidelink relay communication links at the relay UE.

8. The method of claim 7, wherein communicating the message to or from the base station via the sidelink relay communication link comprises:
   communicating the message via a second set of beams, wherein the second set of beams are determined based at least in part on the first set of beams.

9. The method of claim 1, wherein the relay UE is selected from the plurality of candidate relay UEs based at least in part on a first channel quality associated with a sidelink channel between the first UE and the relay UE, a second channel quality associated with a wireless channel between the relay UE and the base station, or both.

10. The method of claim 1, wherein the relay UE is selected from the plurality of candidate relay UEs based at least in part on an existing communication sidelink between the first UE and the relay UE.

11. The method of claim 1, wherein the relay UE is selected from the plurality of candidate relay UEs via a machine learning algorithm based at least in part on the one or more existing sidelink relay communication links at the relay UE, the one or more candidate target UEs associated with the relay UE, the one or more existing communication sidelinks between the first UE and the plurality of candidate relay UEs, or any combination thereof.

12. The method of claim 1, wherein the relay UE is selected from the plurality of candidate relay UEs via a machine learning algorithm based at least in part on a first set of beams at the first UE, a second set of beams at the relay UE, a multi-panel communication capability associated with the relay UE, a multi-beam communication capability associated with the relay UE, a power state of the first UE, a power state of the relay UE, or any combination thereof.

13. The method of claim 1, further comprising:
receiving, from the base station, a third control signal that deactivates the sidelink relay communication link based at least in part on the one or more existing sidelink relay communication links at the relay UE, the one or more candidate target UEs associated with the relay UE, the one or more existing communication sidelinks between the first UE and the plurality of candidate relay UEs, or any combination thereof.

14. The method of claim 1,
wherein the first control signal indicates a plurality of sidelink relay communication links for communicating messages between a plurality of target UEs and the base station via the relay UE, the plurality of target UEs including the first UE, or
wherein the second control signal activates the plurality of sidelink relay communication links between for the plurality of target UEs.

15. The method of claim 1, wherein the message including the identification of the relay UE comprises the first control signal, the second control signal, or both.

16. The method of claim 1, wherein the first control signal comprises a radio resource control message, and wherein the second control signal comprises a downlink control information message, a medium access control-control element message, or both.

17. A method for wireless communication at a base station, comprising:
communicating a message comprising an identification of a relay user equipment (UE) for relaying wireless communications between a first UE and the base station, wherein the relay UE is selected from a plurality of candidate relay UEs based at least in part on one or more existing sidelink relay communication links between the first UE and the relay UE, one or more candidate target UEs associated with the relay UE, one or more existing communication sidelinks between the first UE and the plurality of candidate relay UEs, or any combination thereof;
transmitting, to the first UE, the relay UE, or both, and based at least in part on the identification of the relay UE, a first control signal indicating a sidelink relay communication link for communicating messages between the first UE and the base station via the relay UE;
transmitting, to the first UE, the relay UE, or both, a second control signal that activates the sidelink relay communication link indicated via the first control signal; and
communicating, via the sidelink relay communication link, a message to or from the first UE via the relay UE.

18. The method of claim 17, further comprising:
selecting the relay UE from the plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof, wherein communicating the message including the identification of the relay UE comprises transmitting the message to the base station.

19. The method of claim 18, further comprising:
receiving, from the relay UE, an uplink message comprising an indication of the one or more existing sidelink relay communication links at the relay UE, the one or more candidate target UEs associated with the relay UE, or both, wherein selecting the relay UE is based at least in part on receiving the sidelink message.

20. The method of claim 17, wherein communicating the message comprises:
transmitting, to the first UE, the relay UE, or both, the message including the identification of the relay UE.

21. The method of claim 20, further comprising:
receiving, from the first UE, the relay UE, or both, a UE assistance information message comprising an indication of the one or more existing communication sidelinks between the first UE and the plurality of candidate relay UEs, wherein transmitting the message including the identification of the relay UE is based at least in part on receiving the UE assistance information message.

22. The method of claim 20, further comprising:
receiving, from the first UE, a request to establish the sidelink relay communication link with the relay UE; and
transmitting, in response to the request, the message including the identification of the relay UE to the first UE, the relay UE, or both.

23. The method of claim 17, wherein the relay UE is selected from the plurality of candidate relay UEs based at least in part on a first set of beams at the relay UE used for wireless communications via the one or more existing sidelink relay communication links at the relay UE.

24. The method of claim 23, wherein communicating the message to or from the first UE via the sidelink relay communication link comprises:
communicating the message via a second set of beams, wherein the second set of beams are determined based at least in part on the first set of beams.

25. The method of claim 17, wherein the relay UE is selected from the plurality of candidate relay UEs based at least in part on a first channel quality associated with a sidelink channel between the first UE and the relay UE, a second channel quality associated with a wireless channel between the relay UE and the base station, or both.

26. The method of claim 17, further comprising:
transmitting, to the first UE, the relay UE, or both, a third control signal that deactivates the sidelink relay communication link based at least in part on the one or more existing sidelink relay communication links at the relay UE, the one or more candidate target UEs associated with the relay UE, the one or more existing communication sidelinks between the first UE and the plurality of candidate relay UEs, or any combination thereof.

27. The method of claim 17,
wherein the first control signal indicates a plurality of sidelink relay communication links for communicating messages between a plurality of target UEs and the base station via the relay UE, the plurality of target UEs including the first UE, or
wherein the second control signal activates the plurality of sidelink relay communication links between for the plurality of target UEs.

28. A method for wireless communication at a relay user equipment (UE), comprising:
communicating a message comprising an identification of the relay UE for relaying wireless communications between a first UE and a base station, wherein the relay UE is selected from a plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof;
receiving, from the base station based at least in part on the identification of the relay UE, a first control signal indicating a sidelink relay communication link for communicating messages between the first UE and the base station via the relay UE;
receiving, from the base station, a second control signal that activates the sidelink relay communication link indicated via the first control signal; and
communicating a message from the base station to the first UE, from the first UE to the base station, or both.

29. An apparatus at a first user equipment (UE), comprising:
a processor;
memory coupled with the processor; and
instructions stored in the memory and executable by the processor to cause the apparatus to:
communicate a message comprising an identification of a relay UE for relaying wireless communications between the first UE and a base station, wherein the relay UE is selected from a plurality of candidate relay UEs based at least in part on one or more existing sidelink relay communication links at the relay UE, one or more candidate target UEs associated with the relay UE, one or more existing communication sidelinks between the first UE and the plurality of candidate relay UEs, or any combination thereof;
receive, from the base station based at least in part on the identification of the relay UE, a first control signal indicating a sidelink relay communication link for communicating messages between the first UE and the base station via the relay UE;
receive, from the base station, a second control signal that activates the sidelink relay communication link indicated via the first control signal; and
communicate, via the sidelink relay communication link, a message to or from the base station via the relay UE.

* * * * *